(12) United States Patent
Vemula et al.

(10) Patent No.: US 10,083,286 B2
(45) Date of Patent: Sep. 25, 2018

(54) METHOD AND SYSTEM FOR SECURED TRANSFER OF APPLICATION DATA BETWEEN ELECTRONIC DEVICES ON SIMULTANEOUS TOUCH

(71) Applicant: SAMSUNG ELECTRONICS CO., LTD., Suwon-si (KR)

(72) Inventors: Prakash Babu Vemula, Bangalore (IN); Periyasamy Paramasivam, Bangalore (IN); Krishna Kanth Reddy, Bangalore (IN); Vikram Nelvoy Rajendiran, Vellore (IN)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 14/845,550

(22) Filed: Sep. 4, 2015

(65) Prior Publication Data

US 2016/0070899 A1 Mar. 10, 2016

(30) Foreign Application Priority Data

Sep. 4, 2014 (IN) .......................... 4341/CHE/2014
Aug. 28, 2015 (KR) ........................ 10-2015-0121966

(51) Int. Cl.
G06F 21/00 (2013.01)
H04L 9/00 (2006.01)
G06F 21/32 (2013.01)
G06F 3/041 (2006.01)
G06F 3/044 (2006.01)
G06F 21/60 (2013.01)
H04B 13/00 (2006.01)

(52) U.S. Cl.
CPC .............. *G06F 21/32* (2013.01); *G06F 3/044* (2013.01); *G06F 3/0412* (2013.01); *G06F 21/606* (2013.01); *H04B 13/005* (2013.01)

(58) Field of Classification Search
CPC ........ G06F 1/163; G06F 21/31; H04B 13/005
USPC ........ 455/41.1; 713/186; 726/2, 4, 7, 26, 27, 726/29
See application file for complete search history.

(56) References Cited

U.S. PATENT DOCUMENTS

2012/0098948 A1* 4/2012 Lee ....................... A61B 5/1172
348/77
2012/0133605 A1* 5/2012 Tanaka ................. H04B 13/005
345/173
2013/0006859 A1* 1/2013 Lee ....................... H04B 13/005
705/44
2013/0142363 A1 6/2013 Amento et al.

* cited by examiner

*Primary Examiner* — Alexander Lagor
(74) *Attorney, Agent, or Firm* — Sughrue Mion, PLLC

(57) ABSTRACT

A method and a system for transmitting data from a first electronic device to a second electronic device using a human body as a signal transmission path, are provided. The method includes detecting a first touch event on the first electronic device, the first touch event corresponding to the data. The method further includes receiving indication of a second touch event that is detected on the second electronic device, the second touch event corresponding to a memory location in the second electronic device. The method further includes capacitively transmitting the data from the first electronic device to the memory location through the human body in response to the detecting the first touch event and the receiving the indication of the second touch event.

9 Claims, 20 Drawing Sheets

METHOD AND SYSTEM FOR SECURED TRANSFER OF APPLICATION DATA BETWEEN ELECTRONIC DEVICES ON SIMULTANEOUS TOUCH

CROSS-REFERENCE TO RELATED APPLICATION

This application claims priority from Indian Patent Application No. 4341/CHE/2014, filed on Sep. 4, 2014, in the Indian Patent Office, and Korean Patent Application No. 10-2015-0121966, filed on Aug. 28, 2015, in the Korean Intellectual Property Office, the disclosures of which are incorporated herein by reference in their entireties.

BACKGROUND

1. Field

Methods and apparatus consistent with exemplary embodiments relate to a method and a system for secured transfer of application data between electronic devices on a simultaneous touch.

2. Description of the Related Art

With the growth of multitude of electronic devices, different communication systems have evolved over time. The technologies such as Global System for Mobile Communications (GSM), code division multiple access (CDMA), Worldwide Interoperability for Microwave Access (Wi-MAX) have evolved to provide long range communication, whereas technologies such as Wi-Fi, Bluetooth (BT), and communication through the human body have evolved to provide short range communication.

Communication through the human body is a technology of realizing a data communication using the human body instead of a data communication cable. The human body communication can precisely restrict the communication range differently from a telephone communication and a wireless communication. The human body communication has a low risk of a crossed line and a wiretap as opposed to the telephone and the wireless communication, thereby enabling the communication with naked hands. Almost all the communication methods use radio communication, thereby consuming more power. However, the human body communication will not consume more power.

The transferring of an item from one application in a first electronic device to another application in a second electronic device using the human body as the signal transmission path includes multiple steps to be performed by a user. The user has to navigate multiple screens to perform multiple actions to initiate the item transfer. The applications in the first electronic device are not aware about the consumer/producer of the item in the second electronic device while transferring the item from the first electronic device to the second electronic device through the human body. In this scenario, the user intervention is used. Also, the application in the first electronic device and the application in the second electronic device pair and interact with each other, authentication is used. There are many existing methods of authentication such as password, number lock, pattern lock, and so on, but they include explicit action from the user every time, thereby making the process cumbersome to the user.

SUMMARY

Exemplary embodiments address at least the above problems and/or disadvantages and other disadvantages not described above. Also, the exemplary embodiments are not required to overcome the disadvantages described above, and may not overcome any of the problems described above.

Exemplary embodiments provide a method and a system for transmitting an item from a first electronic device to a second electronic device using a human body as a signal transmission path upon detecting a simultaneous touch event on the first device and the second device.

Exemplary embodiments further provide a method to initiate transmission of the identified item from a first memory location of the first electronic device to a second memory location of the second electronic device.

Exemplary embodiments further provide a method to authenticate a user by capturing a first biometric parameter associated with the user from a first carrier signal and capturing a second biometric parameter associated with the user from a second carrier signal to determine a match between the first and second biometric parameters with a plurality of stored biometric parameters in the first electronic device.

According to an aspect of an exemplary embodiment, there is provided a method of transmitting data from a first electronic device to a second electronic device using a human body as a signal transmission path, the method including detecting a first touch event on the first electronic device, the first touch event corresponding to the data. The method further includes receiving indication of a second touch event that is detected on the second electronic device, the second touch event corresponding to a memory location in the second electronic device. The method further includes capacitively transmitting the data from the first electronic device to the memory location through the human body in response to the detecting the first touch event and the receiving the indication of the second touch event.

The method may further include transmitting a first carrier signal from the first electronic device to the second electronic device through the human body in response to the detecting the first touch event, and the receiving may include receiving a second carrier signal from the second electronic device in response to the transmitting the first carrier signal, the second carrier signal indicating the second touch event.

The method may further include capturing a first biometric parameter of a user from the first carrier signal, determining a first match between the first biometric parameter and a first pre-stored biometric parameter, capturing a second biometric parameter of the user from the second carrier signal in response to the determining the first match, determining a second match between the second biometric parameter and a second pre-stored biometric parameter to authenticate the user, and identifying the data to be transmitted from the first electronic device to the memory location in response to the determining the second match.

The first biometric parameter may include at least one among a fingerprint, a heart rate, skin characteristics, retinal characteristics, and voice characteristics.

The second biometric parameter may include at least one among a fingerprint, a heart rate, skin characteristics, retinal characteristics, and voice characteristics.

The first touch event and the second touch event may be simultaneously detected.

The detecting the first touch event may include detecting the first touch event on a touchpad of the first electronic device, the touchpad including a capacitive layer connected to a modulator of the first electronic device, and the capacitive layer including at least one among a touch screen layer and a data coupling layer.

The second touch event may be detected on a touchpad of the second electronic device, the touchpad including a capacitive layer connected to a modulator of the second electronic device, and the capacitive layer including at least one among a touch screen layer and a data coupling layer.

The transmitted data may be demodulated by a demodulator of the second electronic device, and the demodulated data may be stored in the memory location of the second electronic device.

The demodulator of the second electronic device may be connected to a capacitive layer of a touchpad of the second electronic device.

The detecting the first touch event may include detecting the first touch event on a touchpad of the first electronic device through an input interface, the input interface including a direct physical contact or a stylus that is coated with a conducting material.

The second touch event may be detected on a touchpad of the second electronic device through an input interface, the input interface including a direct physical contact or a stylus that is coated with a conducting material.

According to an aspect of another exemplary embodiment, there is provided a method of authenticating a user, the method including detecting a first touch event on a first electronic device, and transmitting a first carrier signal from the first electronic device to a second electronic device through a human body of the user in response to the detecting the first touch event, the first carrier signal having a first biometric parameter of the user. The method further includes receiving a second carrier signal from the second electronic device in response to the transmitting the first carrier signal, the second carrier signal indicating detection of a second touch event on the second electronic device, and the second carrier signal having a second biometric parameter of the user. The method further includes determining a first match between the first biometric parameter and a first pre-stored biometric parameter, determining a second match between the second biometric parameter and a second pre-stored biometric parameter, and authenticating the user based on results of the first match and the second match.

The method may further include performing an action between the first electronic device and the second electronic device in response to the authenticating the user, and the action may include at least one among allowing access to the first electronic device, allowing access to the second electronic device, performing a transaction, and controlling a transaction.

The authenticating may include determining a mismatch between the second biometric parameter and the second pre-stored biometric parameter, and denying authentication of the user in response to the determining the mismatch.

According to an aspect of another exemplary embodiment, there is provided a system configured to exchange data between electronic devices using a human body as a signal transmission path, the system including a first electronic device configured to detect a first touch event on the first electronic device, the first touch event corresponding to the data. The system further includes a second electronic device configured to detect a second touch event on the second electronic device, the second touch event corresponding to a memory location in the second electronic device. The first electronic device is further configured to capacitively transmit the data from the first electronic device to the memory location through the human body in response to the first electronic device detecting the first touch event and the second electronic device detecting the second touch event.

The first electronic device may be further configured to transmit a first carrier signal from the first electronic device to the second electronic device through the human body in response to the first electronic device detecting the first touch event, and the second electronic device may be further configured to transmit a second carrier signal from the second electronic device to the first electronic device in response to the first electronic device transmitting the first carrier signal and the second electronic device detecting the second touch event.

The first electronic device may be further configured to capture a first biometric parameter of a user from the first carrier signal, determine a first match between the first biometric parameter and a first pre-stored biometric parameter, capture a second biometric parameter of the user from the second carrier signal in response to the first electronic device determining the first match, determine a second match between the second biometric parameter and a second pre-stored biometric parameter to authenticate the user, and identify the data to be transmitted from the first electronic device to the memory location in response to the first electronic device determining the second match.

The first electronic device may be further configured to detect the first touch event on a touchpad of the first electronic device, the touchpad including a capacitive layer connected to a modulator of the first electronic device, and the capacitive layer including at least one among a touch screen layer and a data coupling layer.

The second electronic device may be further configured to detect the second touch event on a touchpad of the second electronic device, the touchpad including a capacitive layer connected to a modulator of the second electronic device, and the capacitive layer including at least one among a touch screen layer and a data coupling layer.

The second electronic device may be further configured to demodulate the transmitted data using a demodulator of the second electronic device, and store the demodulated data in the memory location of the second electronic device.

The first electronic device may be further configured to detect the first touch event on a touchpad of the first electronic device through an input interface, the input interface including a direct physical contact or a stylus that is coated with a conducting material.

The second electronic device may be further configured to detect the second touch event on a touchpad of the second electronic device through an input interface, the input interface including a direct physical contact or a stylus that is coated with a conducting material.

According to an aspect of another exemplary embodiment, there is provided a first electronic device configured to authenticate a user, the first electronic device including a processor configured to detect a first touch event on the first electronic device, a transmitter configured to transmit a first carrier signal from the first electronic device to a second electronic device through a human body of the user in response to the processor detecting the first touch event, the first carrier signal having a first biometric parameter of the user. The first electronic device further includes a receiver configured to receive a second carrier signal from the second electronic device in response to the transmitter transmitting the first carrier signal, the second carrier indicating detection of a second touch event on the second electronic device, and the second carrier signal having a second biometric parameter of the user. The processor is further configured to determine a first match between the first biometric parameter and a first pre-stored biometric parameter, determine a second match between the second biometric parameter and a second pre-stored biometric parameter, and authenticate the user based on results of the first match and the second match.

The processor may be further configured to perform an action between the first electronic device and the second electronic device in response to the processor authenticating the user, the action including at least one among allowing access to the first electronic device, allowing access to the second electronic device, performing a transaction, and controlling a transaction.

The processor may be further configured to determine a mismatch between the second biometric parameter and the second pre-stored biometric parameter, and deny authentication of the user in response to the processor determining the mismatch.

According to an aspect of another exemplary embodiment, there is provided an electronic device configured to authenticate a user, the electronic device including a modulator and a demodulator connected to a conducting layer of a touchpad, a processor connected to the modulator and the demodulator, and a memory connected to the processor, the memory storing a program including instructions to cause the processor to receive a carrier signal from another electronic device through a human body of the user in response to a first touch event being detected on the other electronic device, the first carrier signal having a first biometric parameter of the user. The processor is further configured to capture a second biometric parameter of the user based on a second touch event on the touchpad, determine a first match between the first biometric parameter and a first pre-stored biometric parameter, determine a second match between the second biometric parameter and a second pre-stored biometric parameter, and authenticate the user based on results of the first match and the second match.

BRIEF DESCRIPTION OF THE DRAWINGS

The above and/or other aspects will be more apparent by describing exemplary embodiments with reference to the accompanying drawings in which.

DETAILED DESCRIPTION OF EXEMPLARY EMBODIMENTS

Figure 1A:
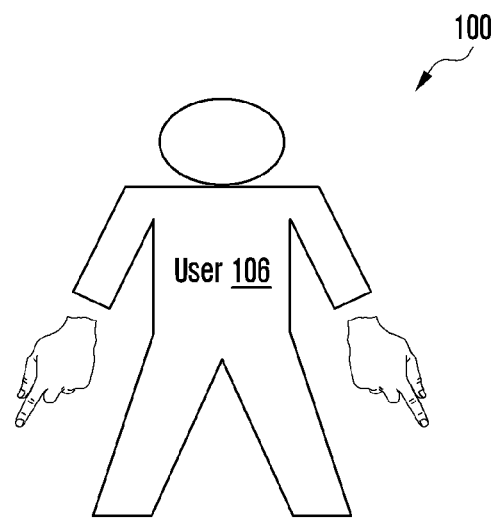
FIGS. 1A and 1B are diagrams illustrating a system for transmitting an item using a human body as a signal transmission path from a first electronic device to a second electronic device, according to exemplary embodiments.
Figure 1A:
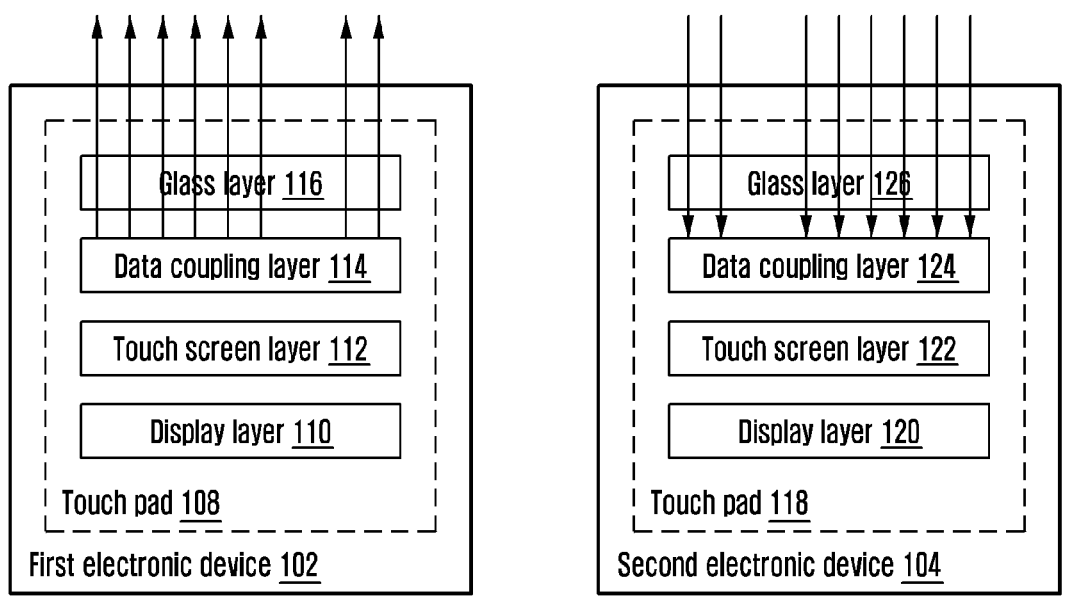

Exemplary embodiments are described in greater detail herein with reference to the accompanying drawings.

In the following description, like drawing reference numerals are used for like elements, even in different drawings. The matters defined in the description, such as detailed construction and elements, are provided to assist in a comprehensive understanding of the exemplary embodiments. However, it is apparent that the exemplary embodiments can be practiced without those specifically defined matters. Also, well-known functions or constructions are not described in detail because they would obscure the description with unnecessary detail.

The terms, such as "unit," "-er (-or)," and "module," described in the description refer to an element for performing at least one function or operation, and may be implemented in hardware, software, or the combination of hardware and software.

The words "user body" and "human body" are used interchangeably throughout the description.

The term "item" refers to a source (i.e., application, image, document, and so on) present in an electronic device.

The terms, such as "first" and "second," are used herein for convenience and do not limit the exemplary embodiments.

A method and a system described herein are robust for transmitting an item from a first electronic device to a second electronic device using a human body as a signal transmission path upon detecting simultaneous touch events on both of the devices.

Unlike conventional systems, transferring of items is carried out by eliminating multiple user actions. The selected applications by the user, upon performing a touch events simultaneously on the first electronic device and the second electronic device, can pair and interact with each other themselves, can find out what all the user can do, and then inform the user, thereby improving the device usability and user interaction greatly. The power consumption can be reduced to the greater extent as the electrical signals are used for item transmission rather than through radio modulation. The authentication can be integrated directly with touch that would simplify the user interaction.

Figure 1B:
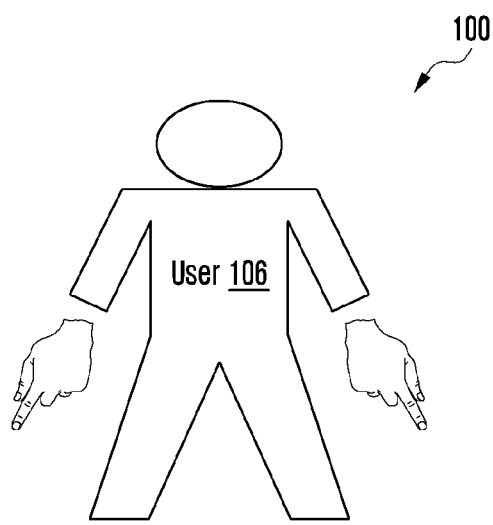
Figure 1B:
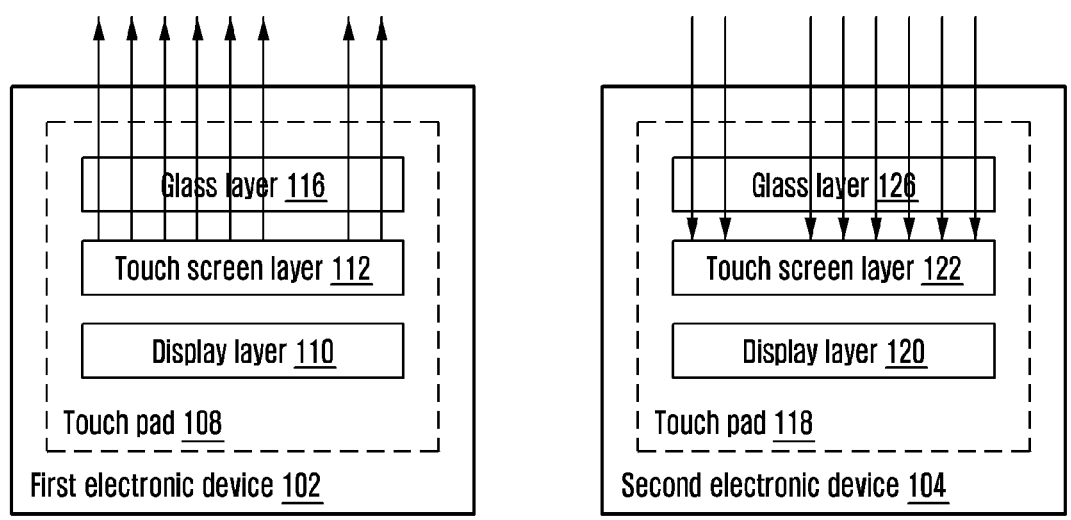

FIGS. 1A and 1B are diagrams illustrating a system for transmitting an item using a human body as a signal transmission path from a first electronic device to a second electronic device, according to exemplary embodiments.

Referring to FIGS. 1A and 1B, a system 100 includes a first electronic device 102, a second electronic device 104, and a user 106 in physical contact with both the first electronic device 102 and the second electronic device 104.

The first electronic device 102 and the second electronic device 104 described herein can be for example and not limited to a laptop, a desktop computer, a mobile phone, a smart phone, a Personal Digital Assistants (PDAs), a tablet, a phablet, or any other electronic device. The first electronic device 102 is configured to include a touch pad 108. The touch pad 108 visually displays data including, but not limited to, graphical user interface ("GUI") elements, text, images, video, virtual keypads and/or keyboards, messaging data, notification messages, metadata, web content, device status, time, date, calendar data, device preferences, map and location data, and the like. The touch pad 108 can be configured to include a display layer 110, a touch screen layer 112, a data coupling layer 114, and a glass layer 116.

The display layer 110 is configured to display a first memory location present in the first electronic device 102 on which the user 106 can perform a touch event to transfer the item from the first memory location to the second memory location of the second electronic device 104. The touch screen layer 112 is configured to assist user 106 to select the item displayed on the display layer 110. In an exemplary embodiment, the item can be selected by using a pointing object (such as a stylus) or a finger. The data coupling layer 114 can be configured to emit electric signals that will be coupled to the human body of the user 106 for transmitting the item from the first memory location of the first electronic device 102 to the second memory location of the second electronic device 104 along with the normal touch screen operations. In an exemplary embodiment, the data coupling layer 114 can use Indium Titanium Oxide (ITO) sheet as the conducting layer through which the signals are emitted along with the normal touch screen operations. The item from the first memory location of the first electronic device 102 can be transmitted to the second memory location of the second electronic device 104 when the user 106 touches the touch screen layer 112 of the first electronic device 102 and the touch screen layer 120 of the second electronic device simultaneously through the data coupling layer 114. The glass layer 114 is configured to provide the protection for the data coupling layer 114. In an exemplary embodiment, the functionalities of the data coupling layer 114 can be included within the touch screen layer 112 as shown in FIG. 1B.

The second electronic device 104 is configured to include a touch pad 118. The touch pad 118 in the second electronic device 104 can be configured to include a display layer 120, a touch screen layer 122, a data coupling layer 124 and a glass layer 126.

The display layer 120 is configured to display the second memory location present in the second electronic device 104 on which the user can perform the touch event to receive the item in the first electronic device 102. The touch screen layer 122 is configured to assist the user 106 to select a location on the second electronic device 104 to receive the transmitted item from the first electronic device 102. The data coupling layer 124 can be configured to receive the transmitted item through the human body of the user 106 from the data coupling layer 114 of the first electronic device 102 on determining simultaneous touch event on the first memory location in the first electronic device 102 and the second memory location in the second electronic device 104. The glass layer 126 is configured to provide protection for the data coupling layer 124. In another exemplary embodiment, the functionalities of the data coupling layer 124 can be included within the touch screen layer 122 as shown in FIG. 1B.

The user 106 is in physical contact with the first electronic device 102 and the second electronic device 104. Further, the user 106 uses his/her body as a signal transmission path for transmitting the item from the first memory location in the first electronic device to the second memory location in the second electronic device. The item can be transmitted only when the simultaneous touch event of the user 106 is detected on the first electronic device 102 and the second electronic device 104.

For example, consider a scenario where the user performs the touch event on a date in the calendar application of a "phone-A" and at the same time the user performs the touch event on the calendar application in a "phone-B." Upon detecting simultaneous touch events on the "phone-A" and the "phone-B" performed by the user, the events marked for the selected date in the "phone-A" will be transmitted to the selected calendar application in the "phone-B by using a human body of the user.

In another example, upon performing the simultaneous touch event on the calendar application icon on the "phone-A" and the "phone-B" may synchronize both of the calendars and show things common to both. In another example, touching a video file in file manager application prepares the list as "copy from," "move from," and "stream from" whereas touching a text file can result in the list of "copy from" and "move from." In another scenario, where touching a folder results in "sync with," "copy from," and "move from" and touching my files application title results in "receive to." In the same way another list is prepared in the second electronic device. The lists are exchanged and incompatible operations are eliminated. If there is more than one compatible operation possible, the device will contextually understand what could be the user intention and try to do that operation. If the device cannot resolve on its own, it will present a list to the user to select the items from both of the devices. The user can select the item in any one device and the operation is performed. As long as there is no conflict in terms of options, no user input is required in terms of options performed.

FIGS. 1A and 1B show a limited overview of the system 100 but, it is to be understood to a person of ordinary skill in the art that another exemplary embodiment is not limited thereto. Further, the system 100 can include different modules communicating among each other along with other components.

Figure 2:
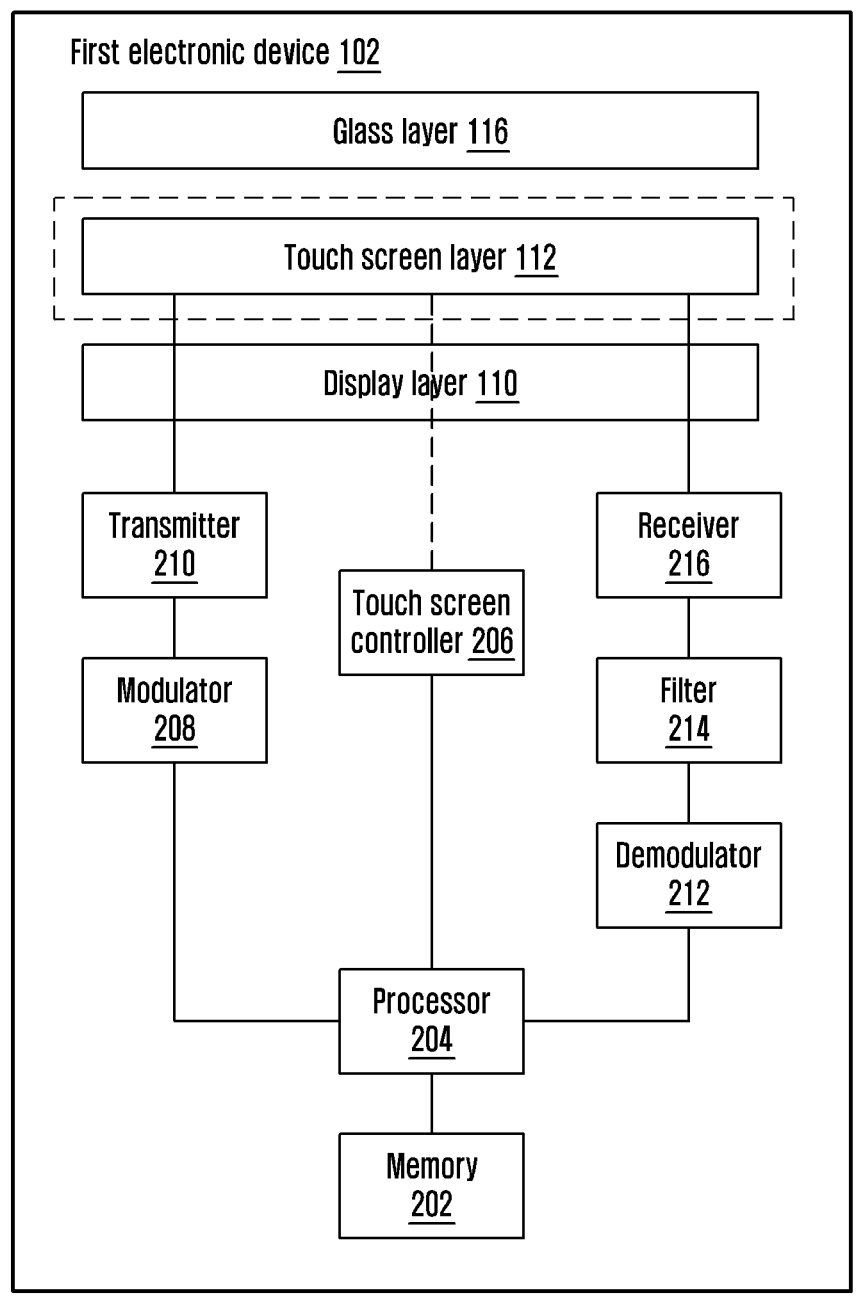
FIG. 2 is a block diagram illustrating a transmitter and a receiver in communication with a touch screen layer included in a first electronic device, according to an exemplary embodiment.
Figure 3:
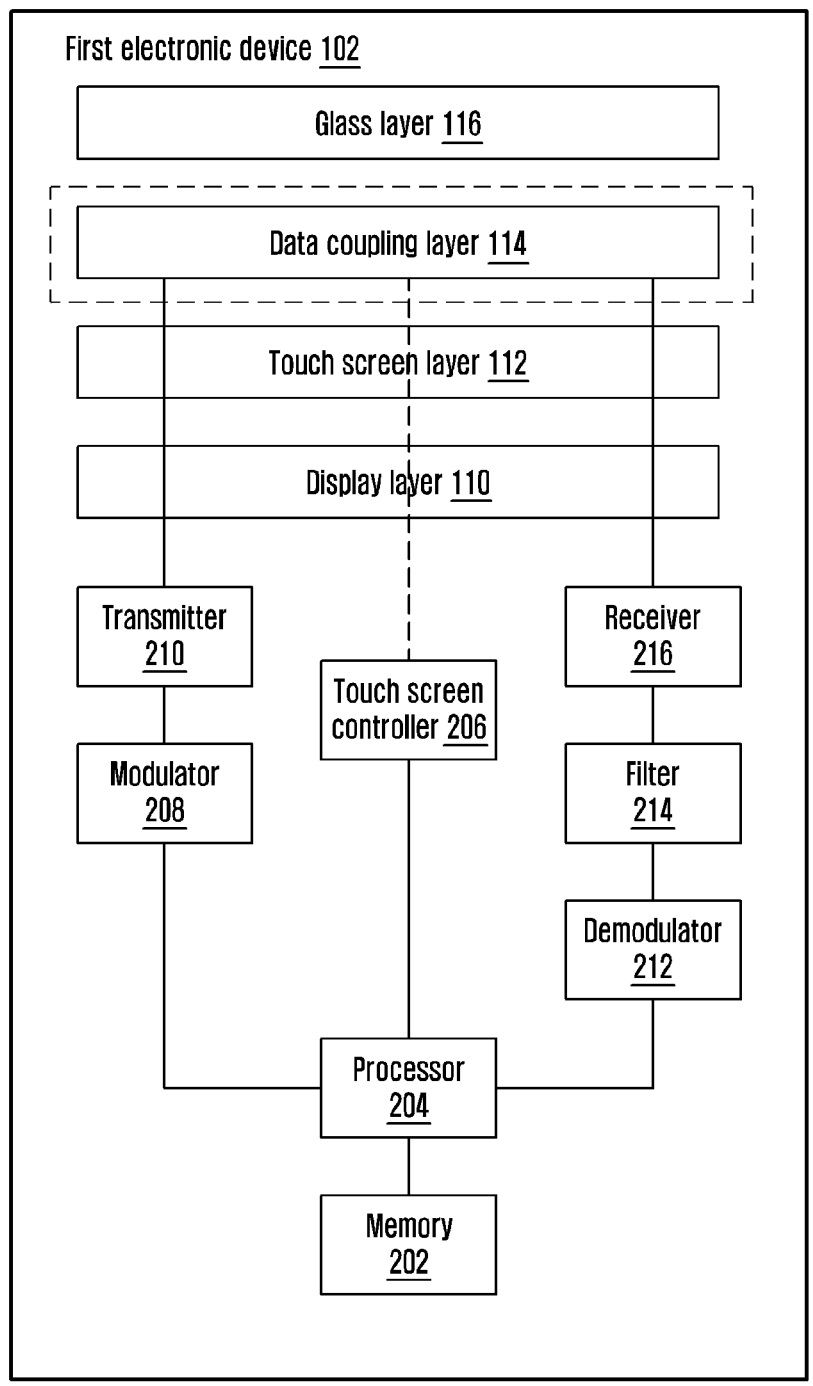
FIG. 3 is a block diagram illustrating a transmitter and a receiver in communication with a data coupling layer included in a first electronic device, according to an exemplary embodiment.

FIG. 2 is a block diagram illustrating a transmitter and a receiver in communication with a touch screen layer included in a first electronic device, according to an exemplary embodiment. FIG. 3 is a block diagram illustrating a transmitter and a receiver in communication with a data coupling layer included in a first electronic device, according to an exemplary embodiment.

Referring to FIG. 2, the touch screen layer 112 can act as a data transmission layer. Referring to FIG. 3, a data transmission layer (i.e., the data coupling layer 114) is separate from the touch screen layer 112.

Referring to FIGS. 2 and 3, the first electronic device 102 providing bidirectional communication is configured to include a memory 202, a processor 204, a touch screen controller 206, a modulator 208, a transmitter 210, a demodulator 212, a filter 214, and a receiver 216. The memory 202 is operatively connected to a processor 204. The memory 202 can be configured to initially store a biometric parameter of the user 106 associated with first electronic device 102. In an exemplary embodiment, the biometric parameters can be for example but not limited to a finger print, a heart rate, skin characteristics, retinal characteristics, and voice characteristics. The memory 202 can be configured to store the items present in the memory locations on the first electronic device 102. Further, the memory 202 can be configured to include instructions that will be executed by the processor 204. The processor 204 is configured to be coupled with the touch screen controller 206, memory 202, modulator 208, and demodulator 212.

The touch screen controller 206 can be coupled to the touch screen layer 112 or the data coupling layer 114 and the processor 204. The touch screen controller 206 can be configured to identify the first touch event on the touch screen layer 112 of the first electronic device 102. The first touch event can be associated with the first memory location of the first electronic device 102. Upon receiving the signal regarding the first touch event identified by the touch screen controller 206, the processor 204 can be configured to send a command to the modulator 208 to set a first carrier signal. The processor 204 can be configured to send a command to the modulator 208 to modulate the data over the first carrier signal. A first biometric parameter associated with the user 106 can be captured form the first carrier signal. The processor 204 can be configured to identify the item from the first memory location stored in the memory 202 on which the first touch event is performed by the user 106. The identified item can be sent to the modulator 208. The modulator 208 can be configured to modulate the item onto the first carrier signal, thereby sending the modulated item to the transmitter 210. The touch screen controller 206 and transmitter 210 can be operated independently as long as the frequency of the signals does not overlap.

Further, the touch screen controller 206 can be configured to identify a second touch event on the touch screen layer 112 of the first electronic device 102. The second touch event can be associated with the second memory location of the first electronic device 102. The processor 204 can be configured to send the command to the modulator 208 to set a second carrier signal. A second biometric parameter associated with the user can be captured from the second carrier signal.

The processor 204 can be configured to determine a match between the first biometric parameter with the first pre-stored biometric parameter and the second biometric parameter with the second pre-stored biometric parameters in the memory 202 of the first electronic device 102 to authenticate the user 106. Upon successful authentication of the user 106, the item from the first memory location can be capacitively transmitted through the user body using the transmitter 210. The transmitted item from the first memory location can be received by the receiver 216 and then sent to the filter 214. The filter 214 can be configured to filter the noise, amplify the signal, and then send the amplified signal to the demodulator 212. The processor 204 can be configured to send the command to the demodulator 212 to demodulate the item. The processor 204 can be configured to receive the item from the demodulator 212, and the transmitter 210 can send the item to the second memory location on which the second touch event is performed by the user 106. The item will be stored in the memory 202 of the first electronic device 102. Further, the processor 204 can be configured to send the command to the touch screen controller 206 to pause/start its operation.

Figure 4:
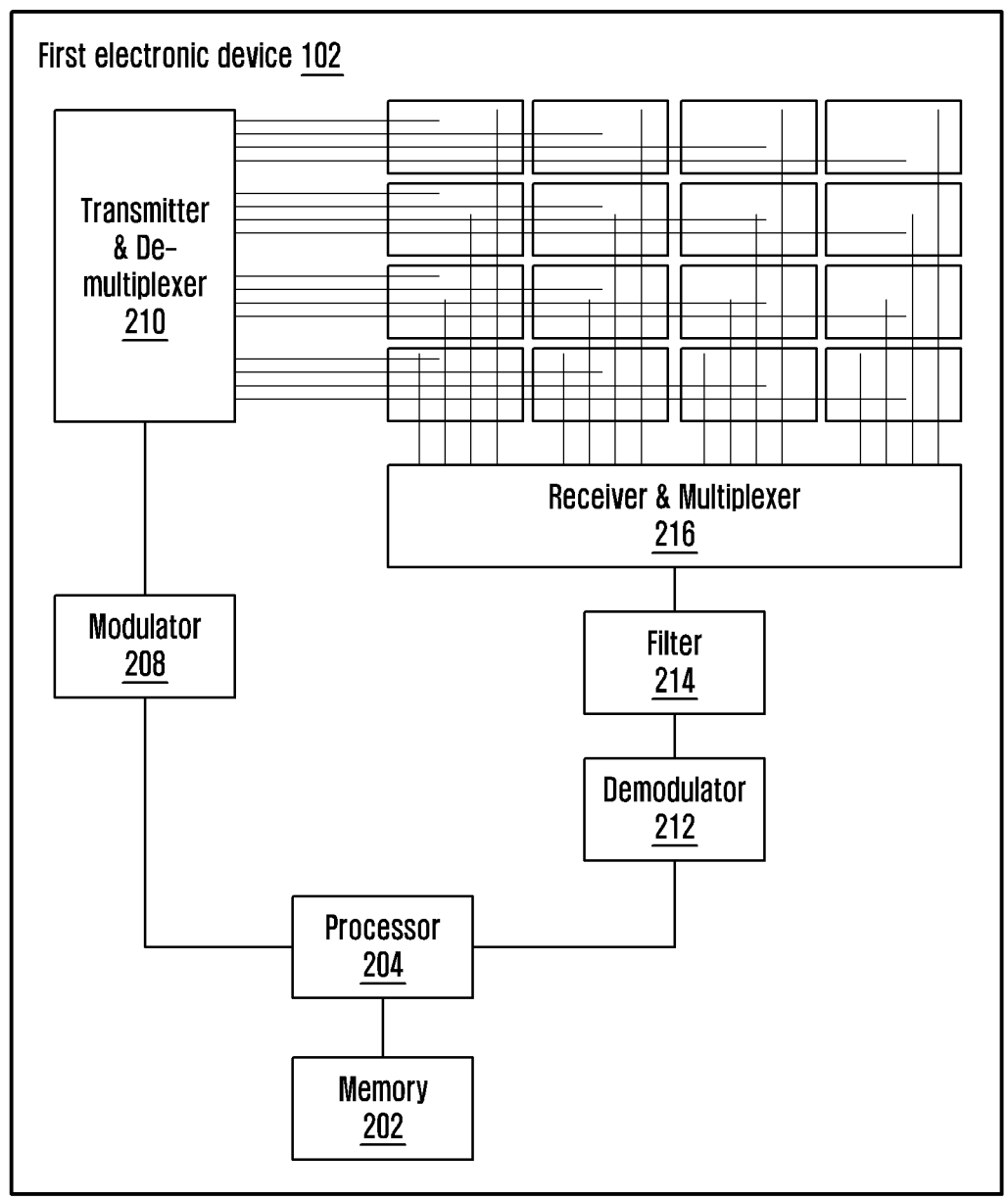
FIG. 4 is a block diagram illustrating a segmented data coupling layer with a projected capacitance, according to an exemplary embodiment.

FIG. 4 is a block diagram illustrating a segmented data coupling layer with a projected capacitance, according to an exemplary embodiment. Referring to FIG. 4, the data coupling layer 114 is divided into several segments. All the segments are connected to the transmitter 210 through a de-multiplexer, and are connected to the receiver 216 through a multiplexer. The de-multiplexer can be configured in such a way that any segment can be configured as the transmitter 210. The multiplexer can be configured in such a way that any other segment can be configured as the receiver 216. In this way, any part of the touch pad 108 can be configured as the transmitter 210 or receiver 216. The application will inform the hardware to configure which area as the transmitter 210 and which area is the receiver 216.

From FIG. 2, FIG. 3, and FIG. 4, it is evident that the first electronic device 102 can be used for bidirectional communication because both the transmitter 210 and the receiver 216 are present within the first electronic device 102. It is to be understood to a person of ordinary skill in the art that the transmitter 210 can be included in the first electronic device 102 and the receiver 216 can be included in the second electronic device 104 or vice-versa to perform exemplary embodiments. Unlike conventional systems, transferring of the item between the applications is performed in an intuitively user friendly manner. The item transfer can be initiated between the applications currently active on the two separate devices by touching two devices simultaneously. The applications can decide what item to be transferred and then initiate the actual item transfer.

Figure 5A:
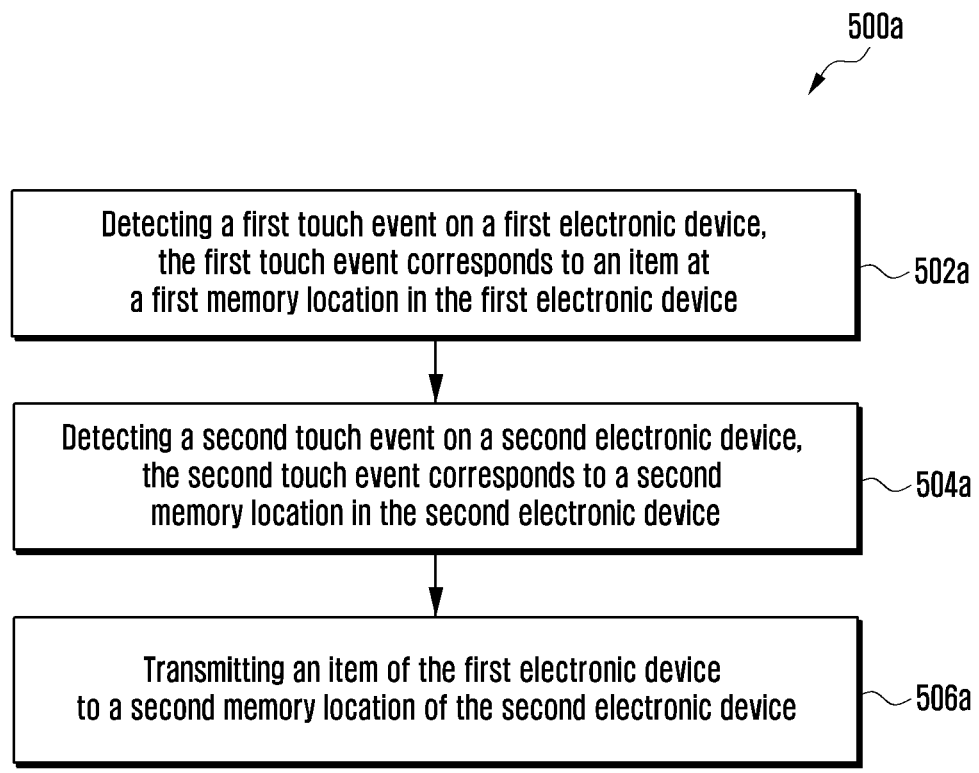
FIGS. 5A and 5B are flow diagrams illustrating methods of transmitting an item using a human body as a signal transmission path, according to exemplary embodiments.
Figure 5B:
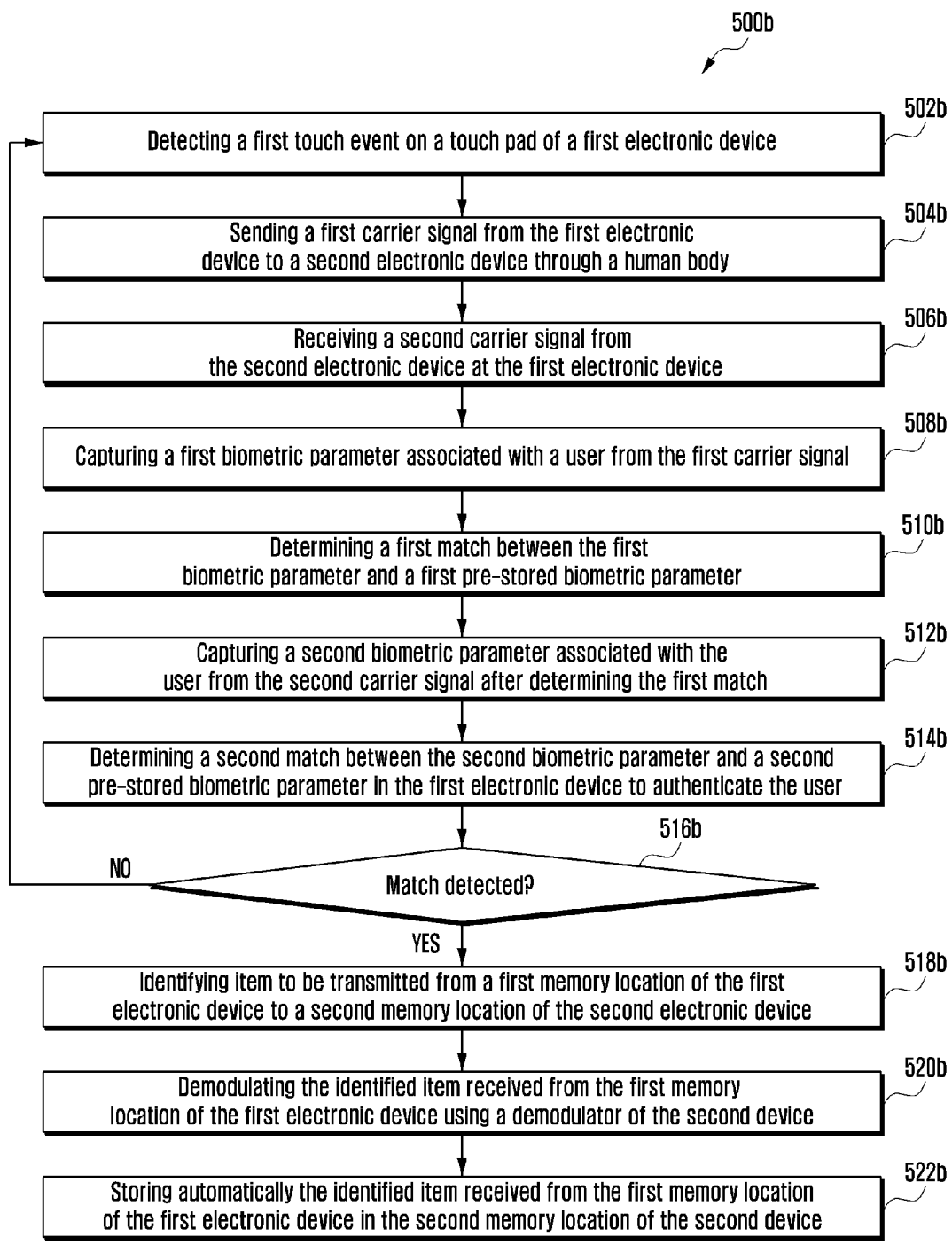

FIGS. 5A and 5B are flow diagrams illustrating methods of transmitting an item using a human body as a signal transmission path, according to exemplary embodiments.

FIG. 5A is flow diagram illustrating a method 500a of transmitting an item from the first electronic device 102 to the second electronic device 104 using a human body as a signal transmission path. At step 502a, the method 500a includes detecting a first touch event on the first electronic device 102. The first touch event corresponds to the item at a first memory location in the first electronic device 102. The method 500a allows the touch screen controller 206 to determine the first touch event on the touch pad 108 of the first electronic device 102. At step 504a, the method 500a includes detecting a second touch event on the second electronic device. The 104 second touch event corresponds to a second memory location in the second electronic device 104. The method 500a allows the touch screen controller 206 to detect the second touch event on the second electronic device 104. At step 506a, the method 500a includes transmitting the item of the first electronic device 102 to the second memory location of the second electronic device 104. The item is capacitively transmitted through the human body from the first electronic device 102 to the second electronic device 104.

The actions, acts, blocks, steps, and the like in method 500a may be performed in the order presented, in a different order or simultaneously. Further, in exemplary embodiments, actions, acts, blocks, steps, and the like may be omitted, added, modified, skipped, and the like without departing from the scope of exemplary embodiments.

FIG. 5B is a flow diagram illustrating a method 500b of transmitting an item from the first electronic device 102 to the second electronic device 104 using a human body as a signal transmission path. At step 502b, the method 500b includes detecting a first touch event on the touch pad 108 of the first electronic device 102. In an exemplary embodiment, the first touch event corresponds to the item at a first memory location in the first electronic device. The method 500b allows the touch screen controller 206 to determine the first touch event on the touch pad 108 of the first electronic device 102. In an exemplary embodiment, the user touches the touch pad 108 of the first electronic device 102 using an input interface. The input interface includes a direct physical contact or a stylus. For example, consider a scenario where the user performed the first touch event on an image present in the "phone-1." The touch screen controller in the "phone-1" determines the first touch event on the touch pad of the "phone-1."

At step 504b, the method 500b includes sending a first carrier signal from the first electronic device 102 to the second electronic device 104 through a human body. The method 500b allows the transmitter 210 to send the first carrier signal of the first electronic device 102 to the second electronic device 104 through the human body. The first carrier signal includes a first biometric parameter associated with the user 106. For example, the first biometric parameter associated with the user includes a finger print, a heart rate, skin characteristics, retinal characteristics, and voice characteristics. For example, the transmitter in the "phone-1" will send the first carrier signal to the "phone-2" through the human body. In an exemplary embodiment, the transmitter 210 of the first electronic device 102 is connected to a capacitive layer of the touch pad 108 of the first electronic device 102. The capacitive layer includes the touch screen layer 112 and the data coupling layer 114.

At step 506b, the method 500b includes receiving a second carrier signal from the second electronic device 104 at the first electronic device 102. The method 500b allows the transmitter of the second electronic device 104 to send the second carrier signal to the first electronic device 102. The second carrier signal includes a second biometric parameter associated with the user 106. The second carrier signal is sent after detecting a second touch event corresponding to a second memory location in the second electronic device. In an exemplary embodiment, the transmitter of the second electronic device 104 is connected to a capacitive layer of the touch pad 118 of the second electronic device 104. The capacitive layer includes the touch screen layer 122 and the data coupling layer 124 as shown in FIG. 1A. For example, the second biometric parameter associated with the user includes a finger print, a heart rate, skin characteristics, retinal characteristics, and voice characteristics. For example, the second carrier signal from the transmitter of the "phone-2" is received at the "phone-1."

At step 508b, the method 500b includes capturing the first biometric parameter associated with the user 106 from the first carrier signal. The method 500b allows the processor 204 to capture the first biometric parameter associated with the user 106 from the first carrier signal. For example, the processor in the "phone-1" captures the first biometric parameter associated with the user from the first carrier signal.

At step 510b, the method 500b includes determining a first match between the first biometric parameter and the first pre-stored biometric parameter in the first electronic device. The method 500b allows the processor 204 to determine the first match between the first biometric parameter and the first pre-stored biometric parameter in the first electronic device.

At step 512b, the method 500b includes capturing the second biometric parameter associated with the user 106 from the second carrier signal after determining the first match. The method 500b allows the processor 204 to capture the second biometric parameter associated with the user 106 from the second carrier signal after determining the first match. For example, the processor in the "phone-1" to capture the second biometric parameter associated with the user from the second carrier signal after determining the first match.

At step 514b, the method 500b includes determining a second match between the second biometric parameter and the second pre-stored biometric parameters in the first electronic device 102 to authenticate the user 106. The method 500b allows the processor 204 to determine the match between the second biometric parameter and the second pre-stored biometric parameters in the first electronic device 102 to authenticate the user 106. For example, the processor in the "phone-1" determines the match between the second biometric parameter and the second pre-stored biometric parameter in the "phone-1" to authenticate the user.

If it is determined at step 516b that the second match is detected, then at step 518b the method 500b includes identifying the item to be transmitted from the first memory location of the first electronic device 102 to the second memory location of the second electronic device 104. The method 500b allows the processor 204 to identify the item to be transmitted from the first memory location of the first electronic device 102 to the second memory location of the second electronic device 104. For example, the processor in the "phone-1" transmits the image from the Folder-A in the "phone-1" to the Folder-B in the "phone-2." If it is determined at step 516b that the second match is not detected, then at step 502b the method 500b includes identifying the first touch event on the touch pad 108 of the first electronic device 102. The method 500b allows the touch screen controller 206 to identify the first touch event on the touch pad 108 of the first electronic device 102.

At step 520b, the method 500b includes demodulating the identified item received from the first memory location of the first electronic device 102 using the demodulator 212 of the second electronic device 104. The method 500b allows the demodulator 212 of the second electronic device 104 to demodulate the identified item received from the first memory location of the first electronic device 102. In an exemplary embodiment, the demodulator 212 of the second electronic device 104 is connected to the capacitive layer of the touch pad 118 of the second electronic device 104. For example, the demodulator in the "phone-2" demodulates the image item received from the Folder-A in the "phone-1."

At step 522b, the method 500b includes storing automatically the identified item received from the first memory location of the first electronic device 102 in the second memory location of the second device 104. The method 500b allows the memory 202 in the second electronic device 104 to store the identified item received from the first memory location of the first electronic device 102 in the second memory location of the second electronic device 104. For example, the demodulated image item is stored in the "phone-1."

In another example, consider a scenario where the user performs the first touch event on an image present at the first memory location in the "phone-1." The touch screen controller in the "phone-1" determines the first touch event on the touch pad of the "phone-1." In an exemplary embodiment, upon detecting the first touch event, the camera of the "phone-1" is triggered to capture a first eye (i.e., retina) of the user. In another exemplary embodiment, the microphone of the "phone-1" is triggered to capture a first voice input of the user. The transmitter in the "phone-1" will send the captured first eye to the "phone-2" through the human body. The user performs the second touch event on an image present at the second memory location in the "phone-2." The touch screen controller in the "phone-2" determines the second touch event on the touch pad of the "phone-2." In an exemplary embodiment, upon detecting the second touch event, the camera of the "phone-2" is triggered to capture a second eye of the user. In another exemplary embodiment, the microphone of the "phone-2" is triggered to capture a second voice input of the user. The transmitter in the "phone-2" will send the captured second eye (i.e., retina) to the "phone-1" through the human body. In an exemplary embodiment, the processor in the "phone-1" determines a first match between the captured first eye (i.e., retina) and the pre-stored retinal characteristics of the user. The processor in the "phone-1" determines a second match between the captured second eye and the pre-stored retinal characteristics to authenticate the user. Here, the second match is performed in response to determining the first match. In another exemplary embodiment, the processor in the "phone-1" determines a first match between the captured first voice input and the first pre-stored voice of the user. The processor in the "phone-1" determines a second match between the captured second voice input and the second pre-stored voice to authenticate the user.

The actions, acts, blocks, steps, and the like in method 500b may be performed in the order presented, in a different order or simultaneously. Further, in exemplary embodiments, actions, acts, blocks, steps, and the like may be omitted, added, modified, skipped, and the like without departing from the scope of exemplary embodiments.

Figure 6:
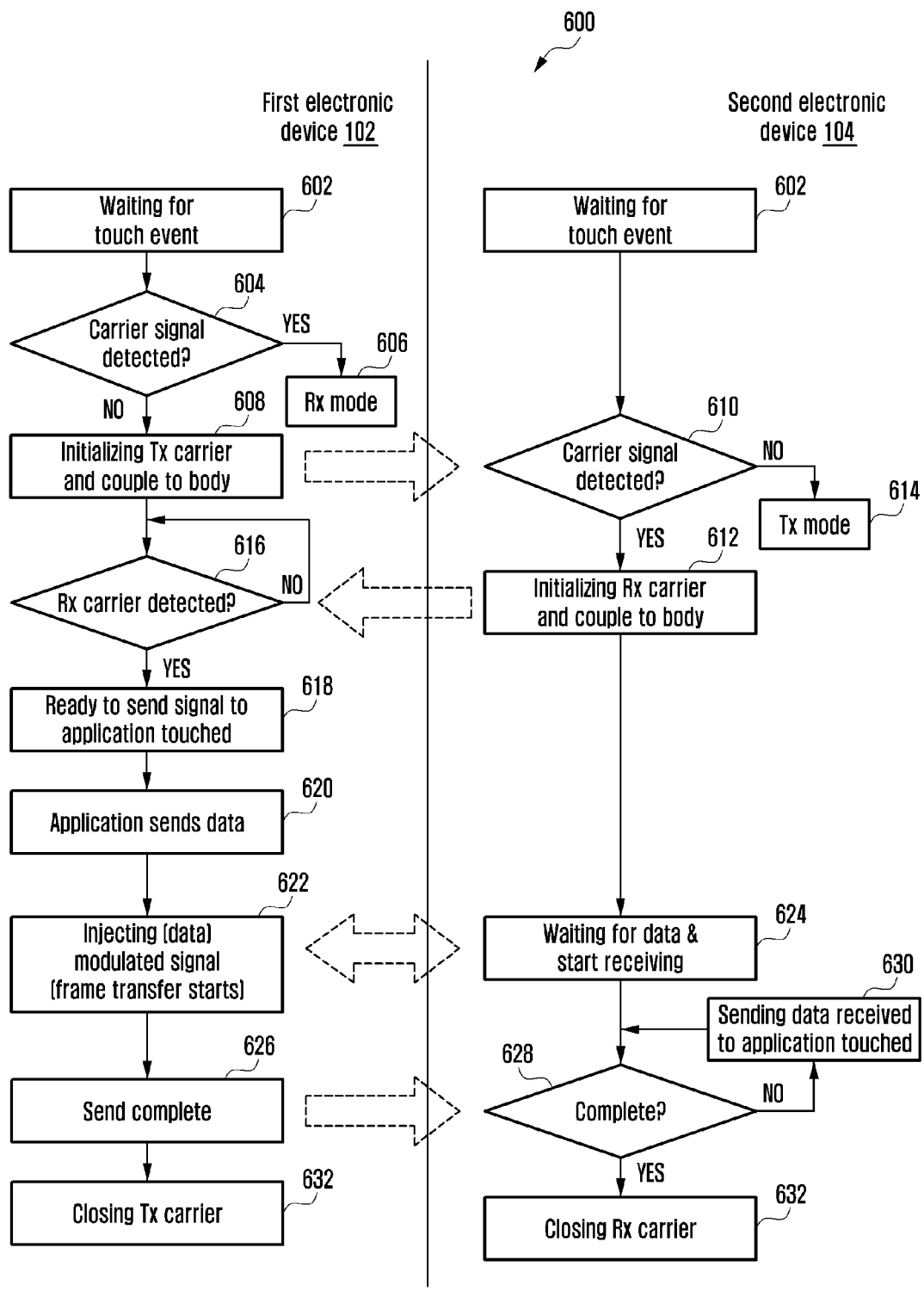
FIG. 6 is a flow diagram illustrating a method of channel establishment for transmitting an item using a human body as a signal transmission path, according to an exemplary embodiment.

FIG. 6 is a flow diagram illustrating a method of transmitting an item using a human body as a signal transmission path by performing an authentication mechanism between a first electronic device and a second electronic device, according to an exemplary embodiment. At step 602, a method 600 includes waiting for a first touch event to be performed by the user 106 on the first memory location of the first electronic device 102 and for a second touch event to be performed by the user 106 on the second memory location of the second electronic device 104 simultaneously. At step 604, the method 600 includes determining whether the carrier signal is detected by the first electronic device 102. If it is determined at step 604 that the carrier signal is detected, then at step 606 the method 600 includes switching to a Receiver (Rx) mode in the first electronic device 102. If it is determined at step 604 that the carrier signal is not detected, then at step 608 the method 600 includes initializing a Transmission (Tx) carrier and coupling to the human body to send the Tx carrier to the second electronic device 104. The method 600 allows the modulator 208 in the first electronic device 102 to initialize the Tx carrier, thereby sending to the Tx carrier to the transmitter 210. The transmitter 210 couples the Tx carrier to the human body to send it to the second electronic device 104.

At step 610, the method 600 includes determining whether the carrier signal is detected by the second electronic device 104. If it is determined at step 610 that the carrier signal is detected, then at step 612 the method 600 includes initializing a Receiver (Rx) carrier and couple to the human body to send it to the first electronic device 102. The method 600 allows the modulator 208 in the second electronic device 104 to initialize the Rx carrier based on the signal received by the demodulator 212 and send it to the transmitter 210. The transmitter 210 couples the Rx carrier to the human body to send it to the first electronic device 102. If it is determined at step 610 that the carrier signal is not detected, then at step 614 the method 600 includes switching into a Tx mode in the second electronic device 104.

At step 616, the method 600 includes determining whether the Rx carrier is detected by the first electronic device 102. If it is determined at step 616 that the Rx carrier is detected by the first electronic device 102, then at step 618 the method 600 includes readying to send the signal to the application touched by the user 106 in the first electronic device 102. If it is determined at step 616 that the Rx carrier is not detected by the first electronic device 102, then at step 616 the method 600 includes determining whether the Rx carrier is detected. At step 620, the method 600 includes sending data or the item from the application on which the user 106 has performed the first touch event. At step 622, the method 600 includes injecting the item over a modulated signal to the second electronic device 104. That is, frame transfer starts.

At step 624, the method 600 includes waiting for the item and starting to receive the item from the first electronic device 102. At step 626, the method 600 includes sending of the item being complete in the first electronic device 102.

At step 628, the method 600 includes determining whether the item is completely sent to the second electronic device 104 by the second electronic device 104. If it is determined at step 628 that the item is received completely from the first electronic device 102, then at step 632, the method 600 includes closing the Rx carrier in the second electronic device 104 and the Tx carrier in the first electronic device 102. If it is determined at step 628 that the item is not received completely from the first electronic device 102, then at step 630 the method 600 includes sending the item received from the first electronic device 102 to the application touched by the user 106 on the second electronic device 104.

For example, item transmission is initiated by sending a beacon signal as soon as the user touches the first memory location on the touch pad of the first electronic device. The first electronic device sends the beacon signal in pulses of randomized duration so that if the second electronic device also starts sending the beacon signal as the user touches the second memory location on the touch pad of the second electronic device then it would be possible to detect the second electronic device to initiate the data (or item) transfer. If the user touches only one device, then the beacon signal will not have any response and the device behaves as usual. The short and long touches are normally detected and the actions assigned to them are performed as they are performed currently. The user will not find any difference in the operation of the device. If the user touches the first electronic device and the second electronic device simultaneously (though called simultaneous, there will be difference in the range of a few milliseconds), the first and second electronic devices will send the beacon signal with randomized period and both of the devices detect the presence of other device. The device first initiating the data (or item) transfer becomes master and the device following it becomes slave.

The actions, acts, blocks, steps, and the like in method 600 may be performed in the order presented, in a different order or simultaneously. Further, in embodiments, actions, acts, blocks, steps, and the like may be omitted, added, modified, skipped, and the like without departing from the scope of exemplary embodiments.

Figure 7:
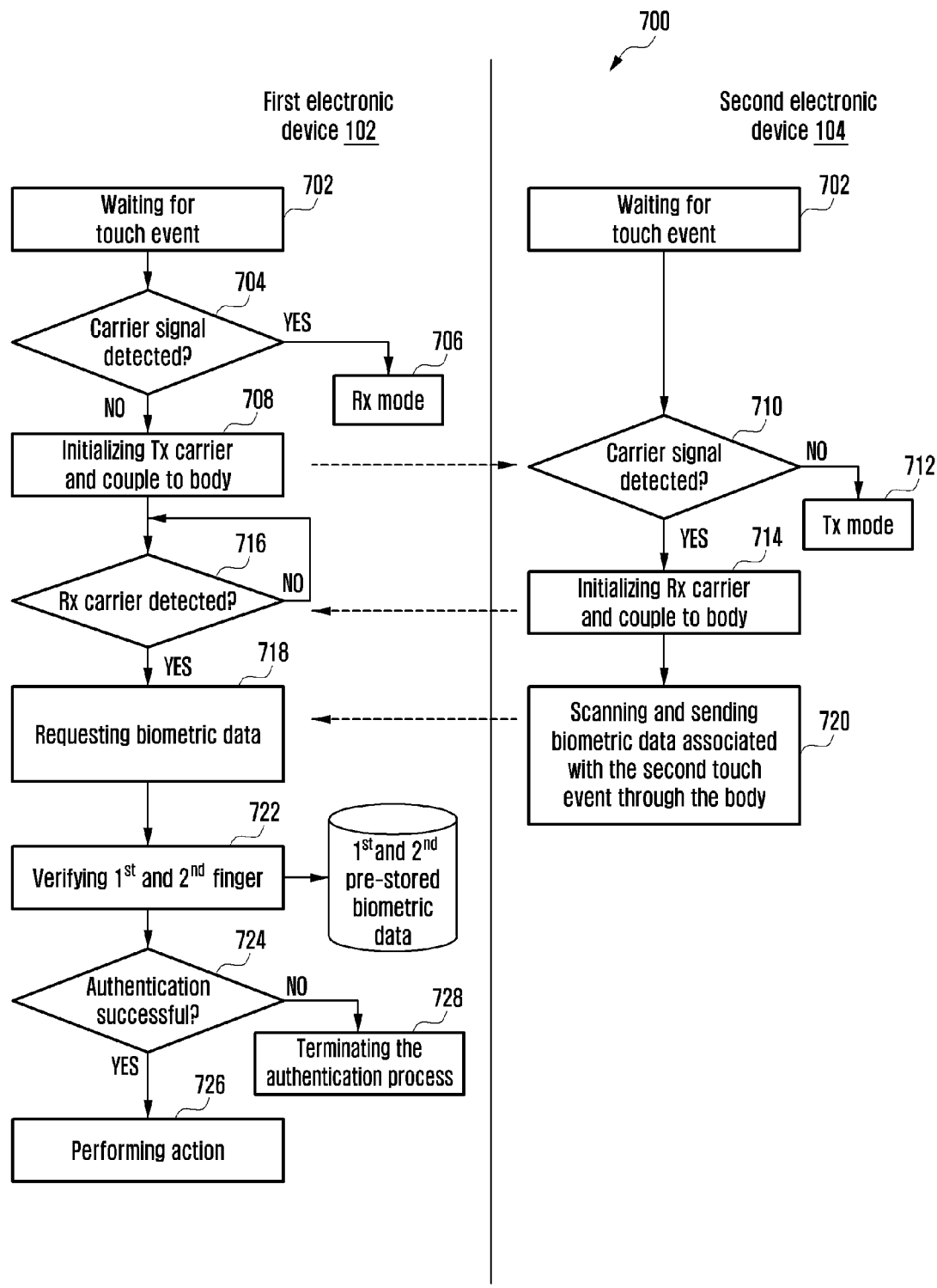
FIG. 7 is a flow diagram illustrating a method of performing an authentication mechanism between a first electronic device and a second electronic device, according to an exemplary embodiment.

FIG. 7 is a flow diagram illustrating a method of performing an authentication mechanism between a first electronic device and a second electronic device, according to an exemplary embodiment. At step 702, a method 700 includes waiting for a first touch event to be performed by the user 106 at the first memory location in the first electronic device 102 and for a second touch event to be performed by the user 106 at the second memory location in the second electronic device 104. At 704, the method 700 includes determining whether the carrier signal is detected by the first electronic device 102. If it is determined at step 704 that the carrier signal is detected, then at step 706 the method 700 includes switching to a Receiver (Rx) mode in the first electronic device 102. If it is determined at step 704 that the carrier signal is not detected, then at step 708 the method 700 includes initializing a Transmission (Tx) carrier and coupling to the human body to send it to the second electronic device 104. The method 700 allows the modulator 208 in the first electronic device 102 to initialize the Tx carrier and sends it to the transmitter 210. The transmitter 210 couples the Tx carrier to the human body to send it to the second electronic device 104.

At step 710, the method 700 includes determining the whether the carrier signal is detected by the second electronic device 104. If it is determined at step 710 that the carrier signal is detected, then at step 714 the method 700 includes initializing a Receiver (Rx) carrier and couple to the human body to send it to the first electronic device 102. The method 700 allows the modulator 208 in the second electronic device 104 to initialize the Rx carrier based on the signal received by the demodulator 212 and sends it to the transmitter 210. The transmitter 210 couples the Rx carrier to the human body to send it to the first electronic device 102. If it is determined at step 710 that the Tx carrier is not detected, then at step 712 the method 700 includes switching into a Tx mode in the second electronic device 104.

At step 716, the method 700 includes determining whether the Rx carrier is detected. If it is determined at step 716 that the Rx carrier is detected by the first electronic device 102, then at step 718, the method 700 includes requesting the first biometric parameter or data associated with the first touch event and the second biometric parameter or data associated with the second touch event of the user 106. If it is determined at step 716 that the Rx carrier is not detected by the first electronic device 102, then at step 716 the method 600 includes determining whether the Rx carrier is detected.

At step 720, the method 700 includes scanning the biometric parameter associated with the second touch event and sending the item to the first electronic device 102 through the body of the user 106. At step 722, the method 700 includes verifying the first biometric parameter (i.e., a first finger) with the first pre-stored biometric parameters and the second biometric parameter (i.e., a second finger) with the second pre-stored biometric parameter of the user 106 in the first electronic device 102. At step 724, the method 700 includes determining whether the authentication of the biometric parameter is successful. If it is determined at step 724 that the authentication is successful, then at step 726 the method 700 includes performing an action. If it is determined at step 724 that the authentication is not successful, then at step 728 the method 700 includes terminating the authentication process. For example, the action can be allowing access to the first electronic device 102, allowing access to the second electronic device 104, and controlling a transaction.

The actions, acts, blocks, steps, and the like in method 700 may be performed in the order presented, in a different order or simultaneously. Further, in exemplary embodiments, actions, acts, blocks, steps, and the like may be omitted, added, modified, skipped, and the like without departing from the scope of exemplary embodiments.

Figure 8:
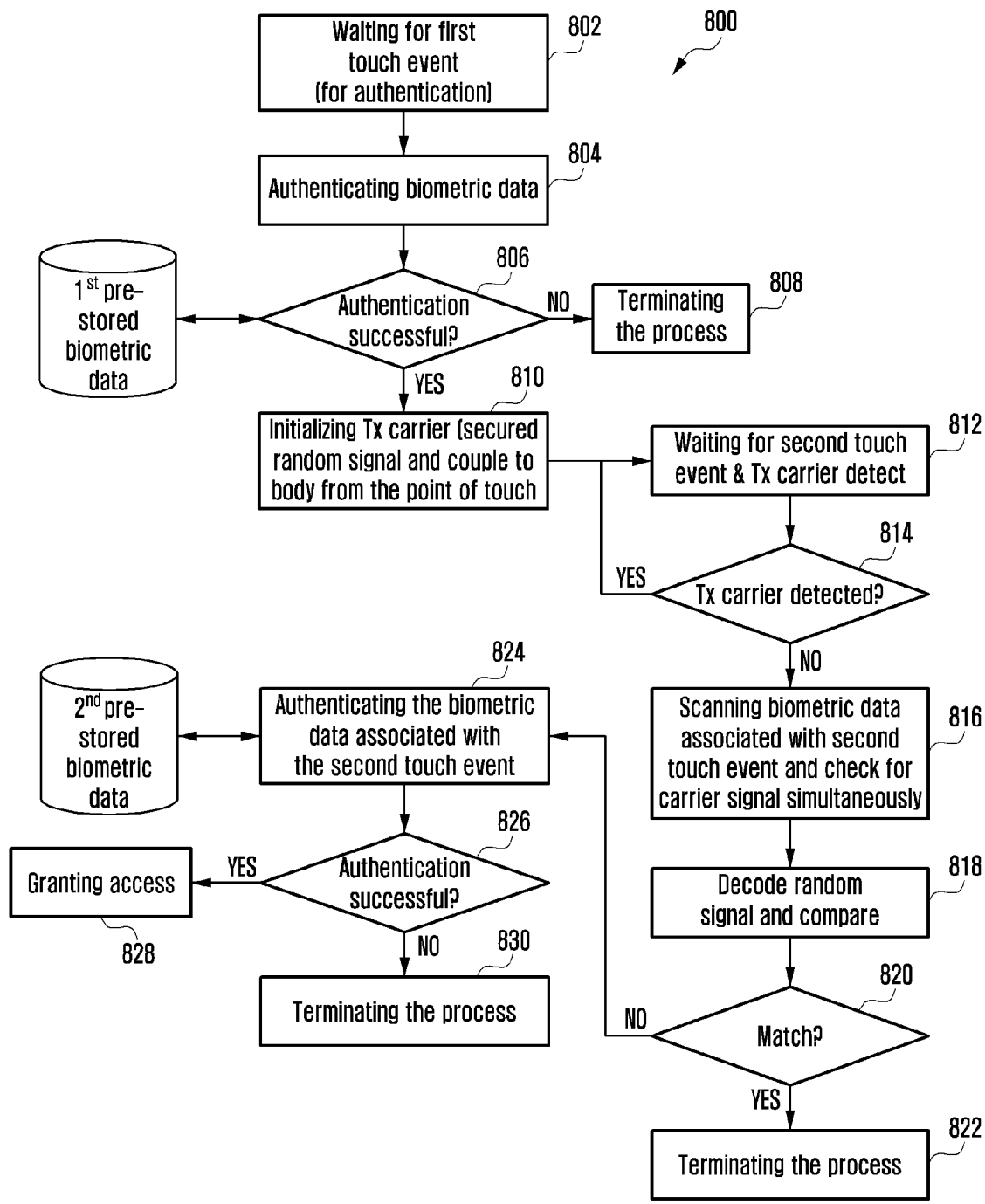
FIG. 8 is a flow diagram illustrating a method of performing an authentication mechanism and a random code comparison text within a first electronic device, according to an exemplary embodiment.

FIG. 8 is a flow diagram illustrating a method of performing an authentication mechanism and a random code comparison text within a first electronic device, according to an exemplary embodiment. At step 802, a method 800 includes waiting for a first touch event (for authentication) to be performed by the user 106 at the first memory location in the first electronic device 102. The touch event can be identified by the touch screen controller 206 in the first electronic device 102. The user 106 can use his/her hands to perform the touch event at the first memory location. At step 804, the method 800 includes authenticating the match between the first biometric parameter or data associated with the first touch event (for example, right finger) and the first pre-stored biometric parameter or data of the user 106 in the first electronic device 102. The method 800 allows the processor 204 to determine the match between the first biometric parameter and the first pre-stored biometric parameter of the user 106.

If it is determined at step 806 that the authentication is successful, then at step 810 the method 800 includes initializing a transmission (Tx) carrier (i.e., a secured random signal) and coupling to the human body from the point of the first touch event. The method 800 allows the transmitter 210 to couple the Tx carrier to the human body from the point of the first touch event. The carrier has a random data that act as a secure code for authentication. If it determined at step 806 that the authentication is not successful, then at step 808 the method 800 includes terminating the authentication process. The method 800 allows the processor 204 to end the authentication process.

At step 812, the method 800 includes waiting for the second touch event to be performed by the user 106 at the second memory location of the first electronic device 102 and determining the Tx carrier. The method 800 allows the touch screen controller 206 to identify the second touch event of the user 106. If it is determined at step 814 that the Tx carrier is detected, then at step 816 the method 800 includes scanning the second biometric parameter or data (for example, left finger) associated with the second touch event that is performed by the user 106 on the first electronic device 102 and checking for the Tx carrier simultaneously. If it is determined at step 814 that the Tx carrier is not detected, then at step 812 the method 800 includes waiting for the second touch event and detecting Tx carrier.

At step 818, the method 800 includes decoding the received random signal and comparing the decoded random signal. The method 800 allows the touch screen controller 206 to send the random signal for decoding to the processor 204. If it is determined at step 820 that the match of the random signal is not detected, then at step 822 the method 800 includes terminating the authentication process. If it is determined at step 820 that the match of the random signal is detected, then at step 824 the method 800 includes authenticating the second biometric parameter associated with the second touch event with the second pre-stored biometric parameter or data of the user 106. The method 800 allows the processor 204 to authenticate the second biometric parameter with the second pre-stored biometric parameter of the user 106.

If it is determined at step 826 that the authentication is successful, then at step 828 granting access for the application to determine the action to be performed. If it is determined at step 826 that the authentication is not successful, then at step 830 the method 800 includes terminating the authentication process.

The actions, acts, blocks, steps, and the like in method 800 may be performed in the order presented, in a different order or simultaneously. Further, in exemplary embodiments, actions, acts, blocks, steps, and the like may be omitted, added, modified, skipped, and the like without departing from the scope of exemplary embodiments.

Figure 9A:
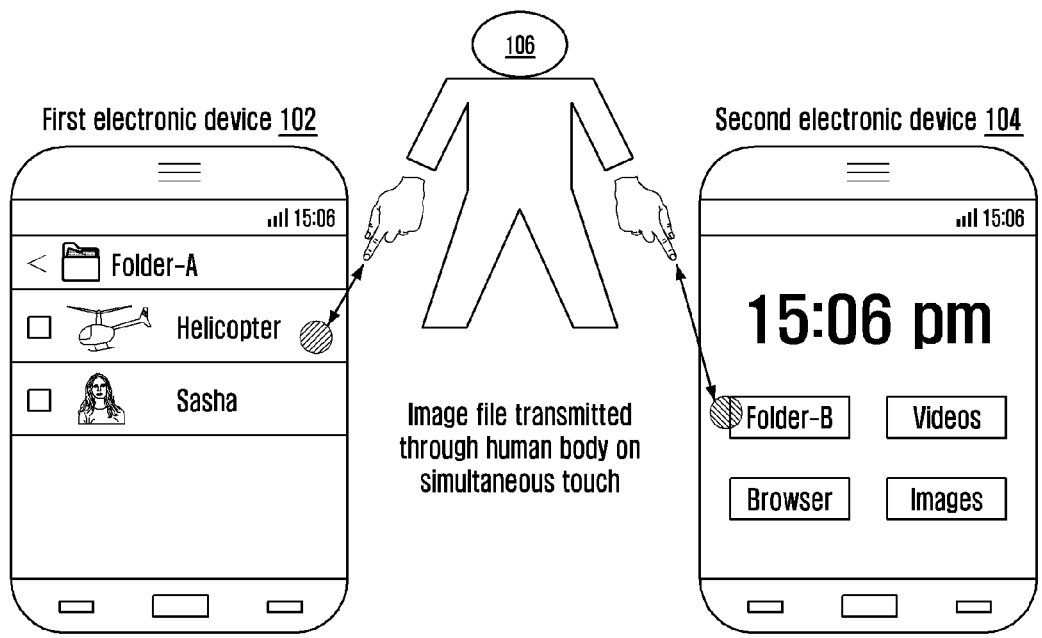
FIGS. 9A and 9B are diagrams illustrating a method of transmitting an image file from a memory location "Folder-A" in a first electronic device to a memory location "Folder-B" in a second electronic device using a human body as a signal transmission path after identifying a simultaneous touch on the first electronic device and second electronic device, according to an exemplary embodiment.
Figure 9B:
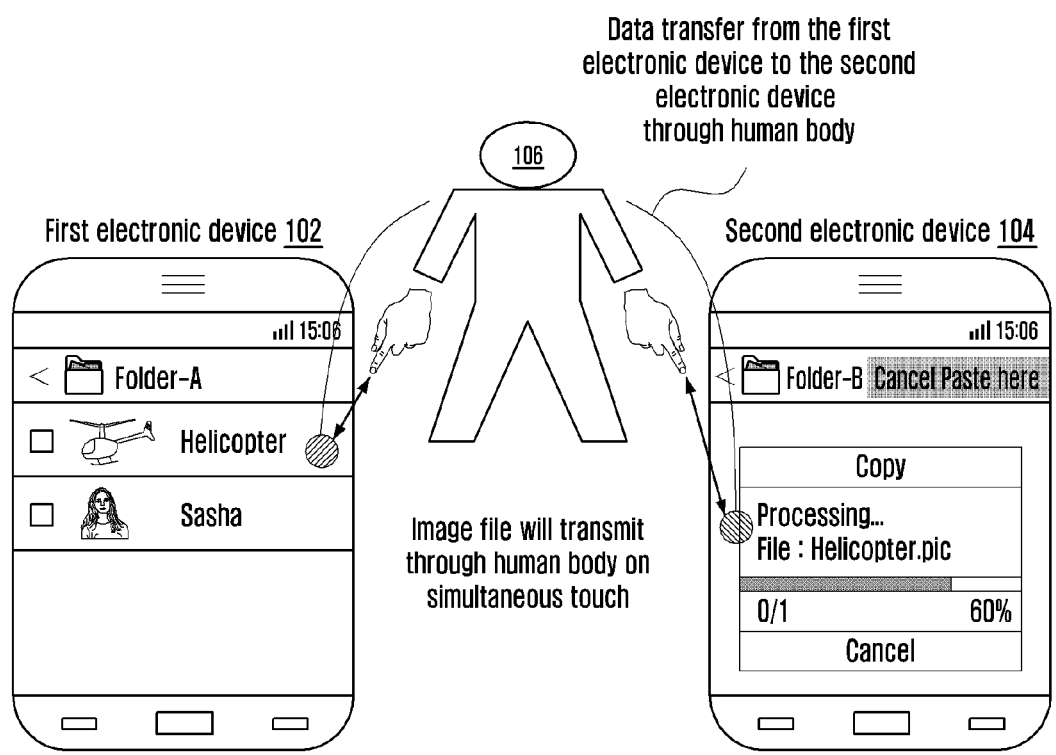

FIGS. 9A and 9B are diagrams illustrating a method of transmitting an image file from a memory location "Folder-A" in a first electronic device to a memory location "Folder-B" in a second electronic device using a human body as a signal transmission path after identifying a simultaneous touch on the first electronic device and second electronic device, according to an exemplary embodiment. The user 106 touches the helicopter image in the memory location "folder-A" in the first electronic device 102. At the same time, the memory location "folder-B" is touched by the user 106 on the second electronic device 104 as shown in FIG. 9A. The helicopter image is transmitted from the first electronic device 102 to the memory location "folder-B" in the second electronic device 104 through the user body as shown in FIG. 9B.

Figure 10:
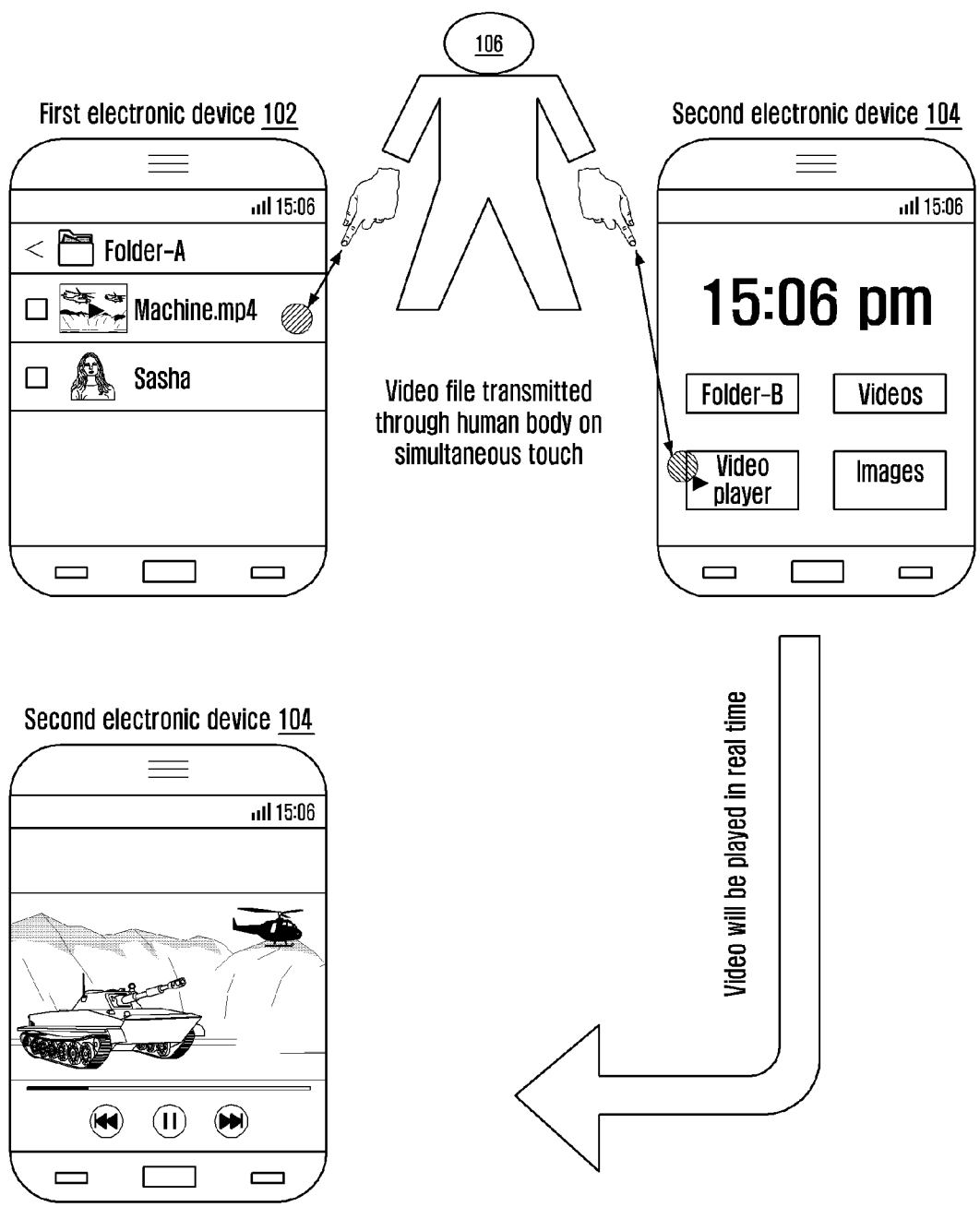
FIG. 10 is a diagram illustrating a method of transmitting a video file from a memory location "Folder-A" in a first electronic device to a video player in a second electronic device for live streaming using a human body as a signal transmission path after identifying a simultaneous touch on the first electronic device and second electronic device, according to an exemplary embodiment.

FIG. 10 is a diagram illustrating a method of transmitting a video file from a memory location "Folder-A" in a first electronic device to a video player in a second electronic device for live streaming using a human body as a signal transmission path after identifying a simultaneous touch on the first electronic device and second electronic device, according to an exemplary embodiment. A machine video file in the memory location "folder-A" in the first electronic device 102 is touched by the user 106. At the same time, a video player in the second electronic device 104 is touched by the user 106. The machine video file is transmitted from the first electronic device 102 to the video player in the second electronic device 104 through the user body for live streaming (i.e., playing in real time) of the video on the second electronic device 104 as shown in FIG. 10. In an exemplary embodiment, the file item need not be transferred through the human body. Only a metadata can be transferred through the human body, and the item can be transmitted through alternate channels like a Bluetooth, Wi-Fi, Near Field communication (NFC), and the like.

Figure 11:
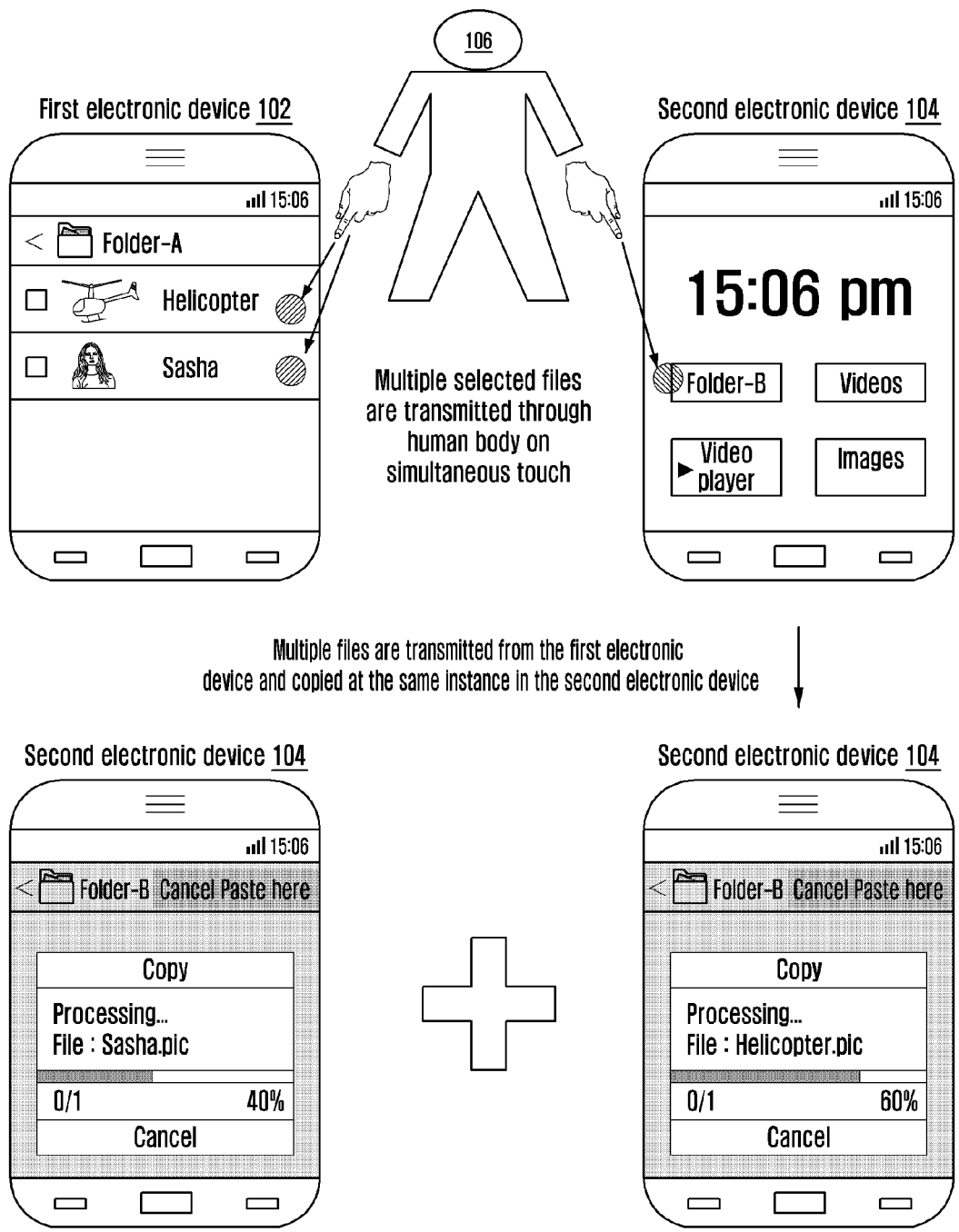
FIG. 11 is a diagram illustrating a method of transmitting multiple image files from a memory location "Folder-A" in a first electronic device to a memory location "Folder-B" in a second electronic device simultaneously using a human body as a signal transmission path after identifying a touch event on the first electronic device and second electronic device at the same time, according to an exemplary embodiment.

FIG. 11 is a diagram illustrating a method of transmitting multiple image files from a memory location "Folder-A" in a first electronic device to a memory location "Folder-B" in a second electronic device simultaneously using a human body as a signal transmission path after identifying a touch event on the first electronic device and second electronic device at the same time, according to an exemplary embodiment. The multiple images (i.e., helicopter image and Sasha image) in the folder-A is touched by the user 106 in the first electronic device 102. At the same time, the folder-B is touched by the user 106 on the second electronic device 104. The multiple images are transmitted from the first electronic device 102 and copied at the folder-B location at the same instance in the second electronic device 104 through the user body as shown in FIG. 11.

Figure 12:
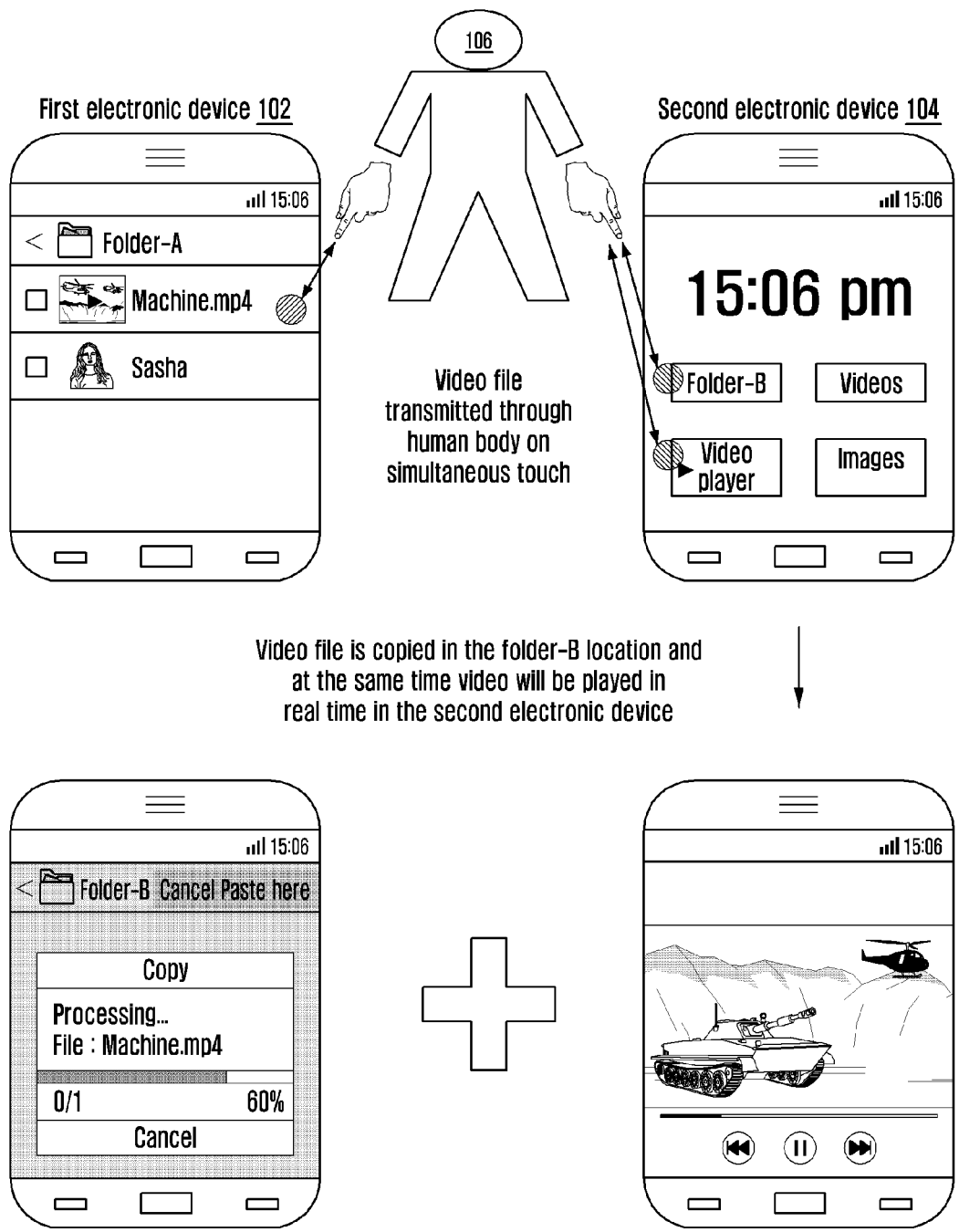
FIG. 12 is a diagram illustrating a method of transmitting a video file from a memory location "Folder-A" in a first electronic device to a video player in a second electronic device for live streaming and to a memory location "Folder-B" location using a human body as a signal transmission path after identifying a simultaneous touch on the first electronic device and second electronic device, according to an exemplary embodiment.

FIG. 12 is a diagram illustrating a method of transmitting a video file from a memory location "Folder-A" in a first electronic device to a video player in a second electronic device for live streaming and to a memory location "Folder-B" location using a human body as a signal transmission path after identifying a simultaneous touch on the first electronic device and second electronic device, according to an exemplary embodiment. The machine video file in the folder-A in the first electronic device 102 is touched by the user 106. At the same time, the folder-B and video player in the second electronic device 104 are touched by the user 106. Upon detecting the simultaneous touch events on the first electronic device 102 and the second electronic device 104, the machine video is transmitted and copied at the folder-b location in the second electronic device 104 and at the same time the video is played in real time using the video player in the second electronic device 104 as shown in FIG. 12. For example, the first electronic device 102 and the second electronic device 104 can be Wi-Fi paired by touching of the application heading in the first electronic device 102 and the second electronic device 104 simultaneously.

Figure 13A:
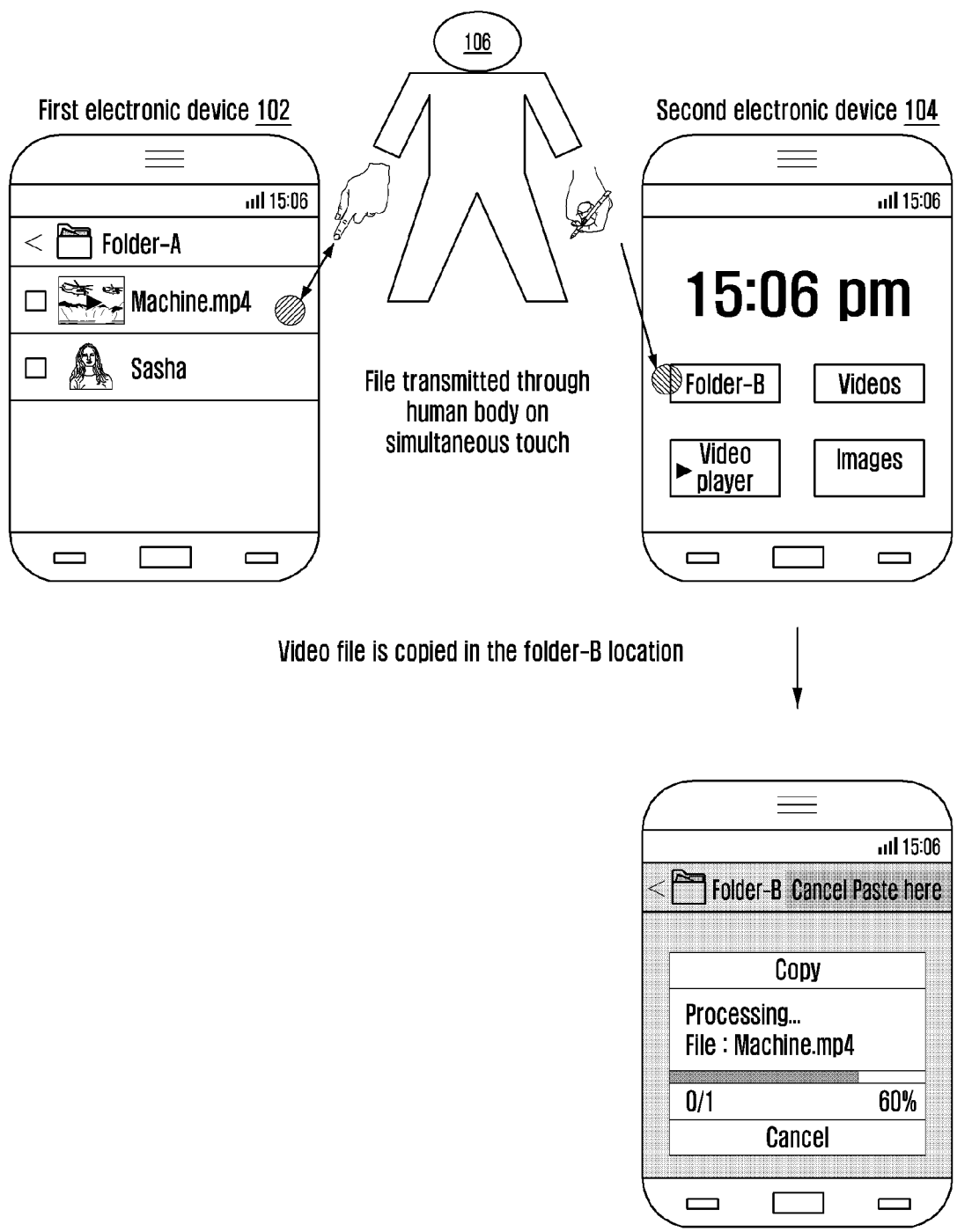
FIGS. 13A and 13B are diagrams illustrating a method of transmitting a video file from a memory location "Folder-A" in a first electronic device to a to a memory location "Folder-B" location using a human body as a signal transmission path after identifying a simultaneous touch using a stylus in one hand of a user on the first electronic device and second electronic device, according to an exemplary embodiment.
Figure 13B:
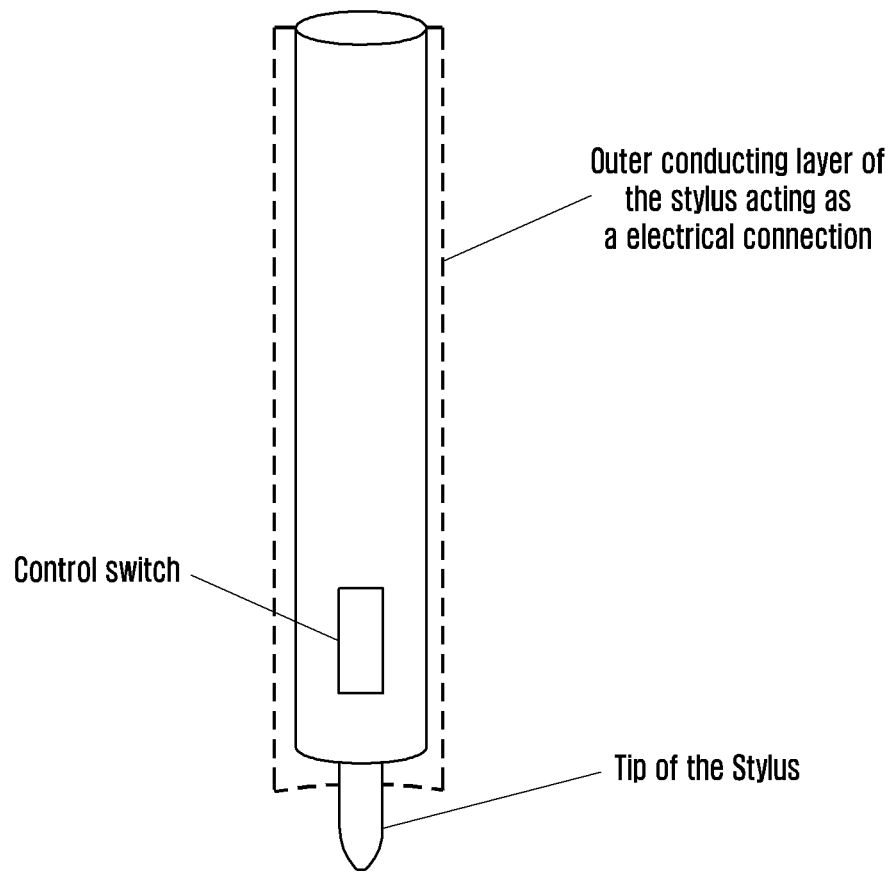

FIGS. 13A and 13B are diagrams illustrating a method of transmitting a video file from a memory location "Folder-A" in a first electronic device to a to a memory location "Folder-B" location using a human body as a signal transmission path after identifying a simultaneous touch using a stylus in one hand of a user on the first electronic device and second electronic device, according to an exemplary embodiment. The stylus is used by the user 106 as shown in FIG. 13A. The capacitive coupling can be established between the data coupling layer 114 to the tip of the stylus between the data coupling layer 114 and the finger of the user 106 as shown in FIG. 13B. Higher sensitivity may be used for effective coupling because the tip of the stylus has small area compared to that of the finger of the user 106. The electrical connection between the tip of the stylus and the human body can be made by making/coating the outer covering of the stylus with a conducting material or layer as shown in FIG. 13B. The electrical connection between the tip of the stylus and the finger can be controlled by a control switch on the stylus as shown in FIG. 13B. It can be designed in such a way that pressing it will establish the connection to transfer the item and releasing it will disconnect the connection and then stylus can be used for usual purposes.

Figure 14A:
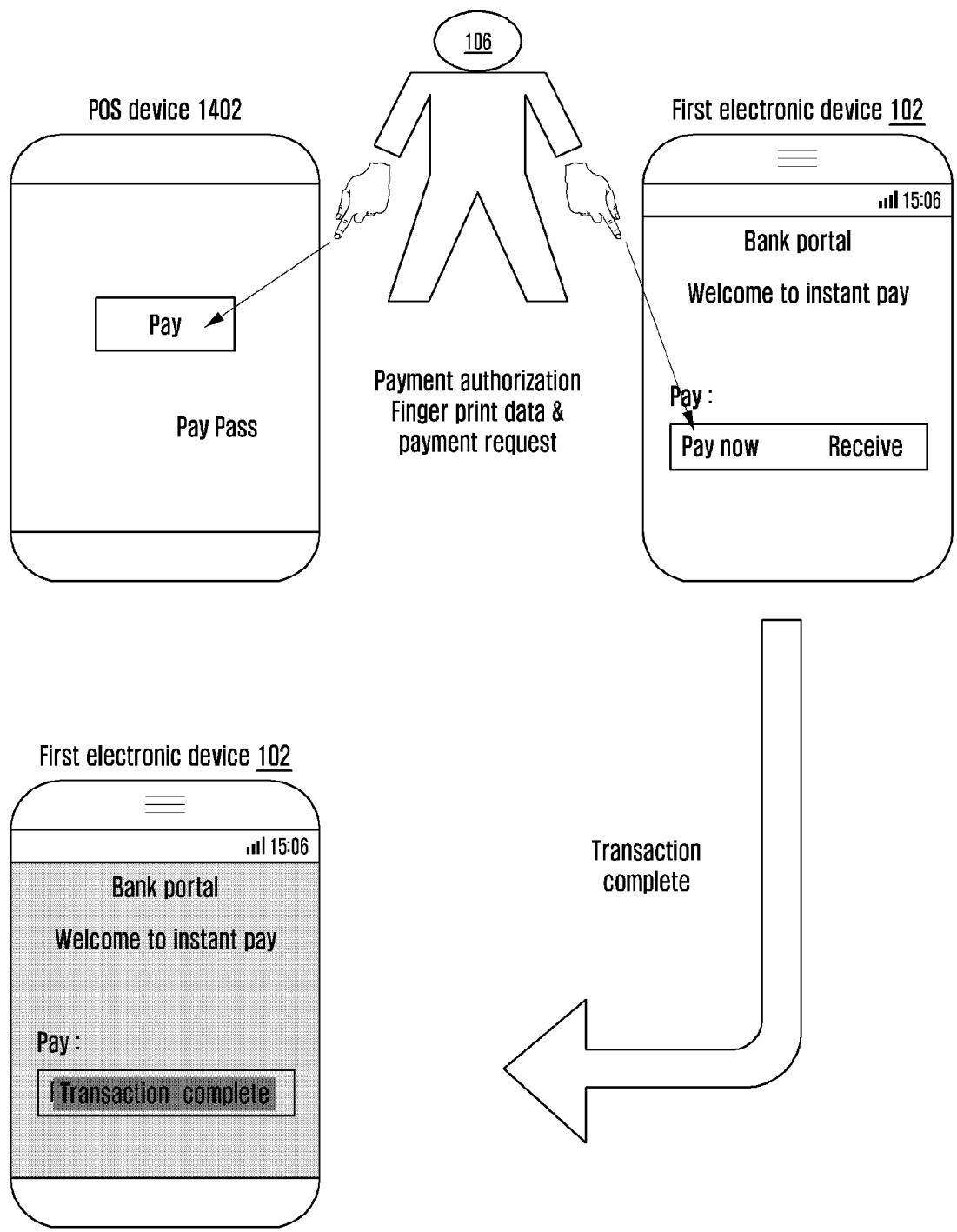
FIGS. 14A and 14B are diagrams illustrating a method of performing authentication between a Point of Sale (POS) device and a first electronic device for completing a payment transaction process, according to an exemplary embodiment.
Figure 14B:
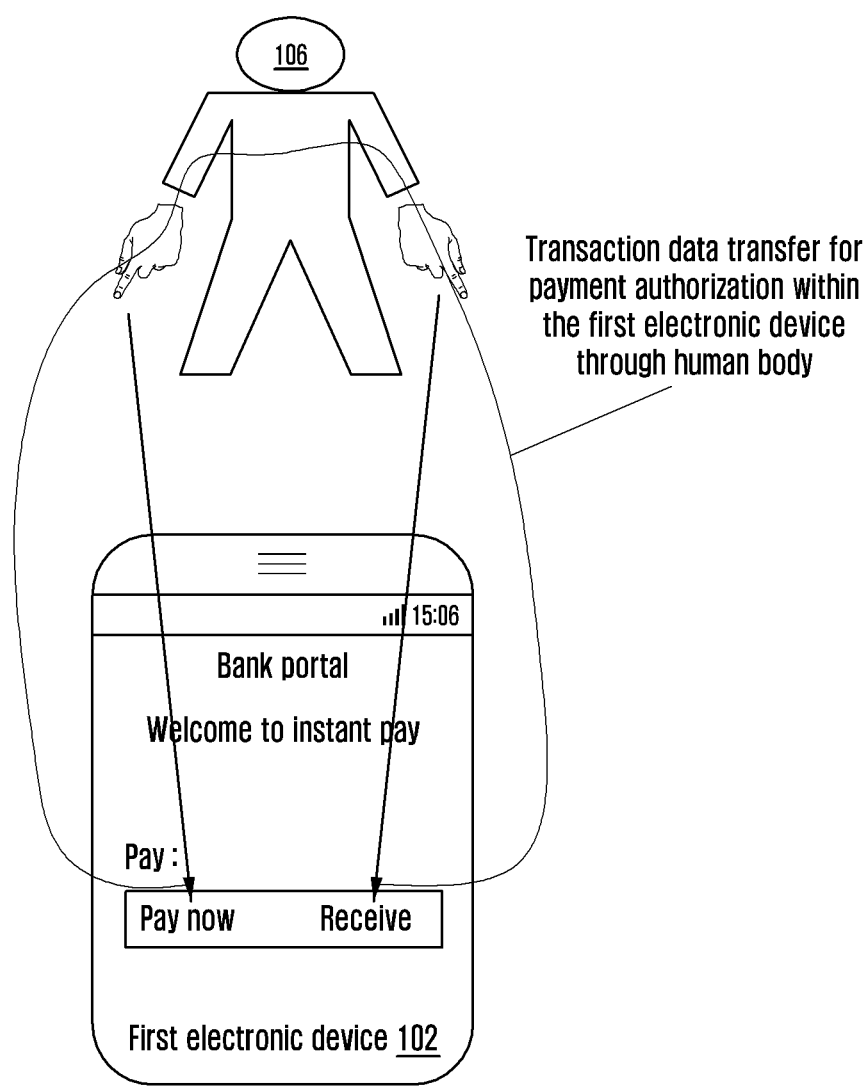

FIGS. 14A and 14B are diagrams illustrating methods of performing authentication between a Point of Sale (POS) device and a first electronic device for completing a payment transaction process, according to exemplary embodiments. The payment authorization between a POS device 1402 and the first electronic device 102 performed by the user 106 is shown in FIG. 14A. The finger prints are recognized at the touched locations of the POS device 1402 and the first electronic device 102. The POS device 1402 captures the first finger print at the touched location in the POS device 1402. The POS device 1402 will send the captured first finger print to the first electronic device 102 through the body of the user 106 to ensure integrity. The first electronic device 102 will capture the second finger print at the touched location in the first electronic device 102. The first electronic device 102 validates both of the finger prints with the already stored finger prints in the database, and indicates that the transaction is complete. On authentication, the transaction will be initiated, and the transaction session is valid only as long as the user 106 touches the POS device 1402 and the first electronic device 102 as shown in FIG. 14A. The authentication within an application can be performed on the same first electronic device 102 to authenticate the biometric parameter associated with the first touch event and the second touch event performed by the user 106 on the first electronic device 102 for payment authorization as shown in FIG. 14B.

Figure 15:
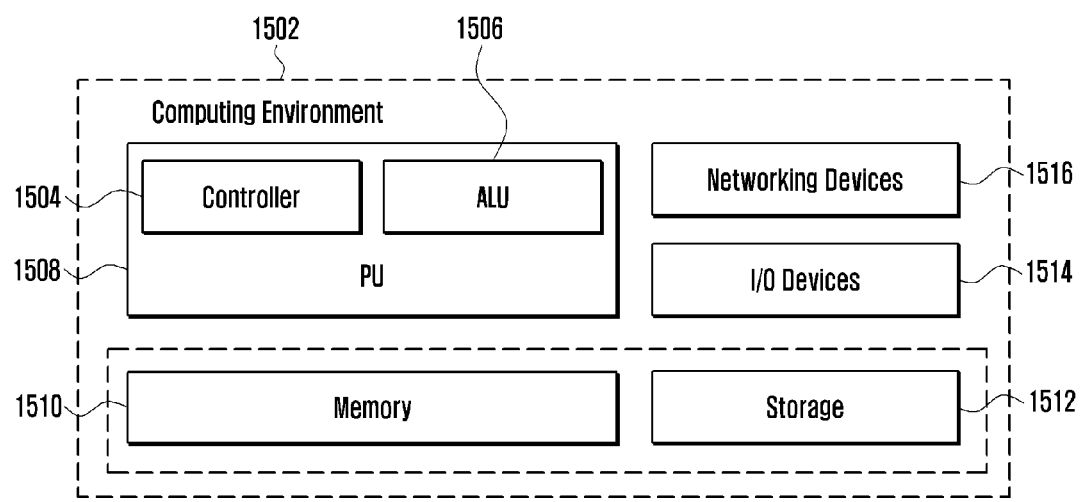
FIG. 15 is a block diagram illustrating a computing environment implementing a method and a system for transmitting an item using a human body as a signal transmission path from a first electronic device to a second electronic device, according to an exemplary embodiment.

FIG. 15 is a block diagram illustrating a computing environment implementing a method and a system for transmitting an item using a human body as a signal transmission path from a first electronic device to a second electronic device, according to an exemplary embodiment. As depicted in the figure, a computing environment 1502 includes at least one processing unit (PU) 1508 that is equipped with a controller 1504 and an Arithmetic Logic Unit (ALU) 1506, a memory 1510, a storage 1512, a plurality of networking devices 1516 and a plurality of input/output (I/O) devices 1514. The processing unit 1508 is responsible for processing the instructions of the algorithm. The processing unit 1508 receives commands from the controller to perform its processing. Further, any logical and arithmetic operations involved in the execution of the instructions are computed with the help of the ALU 1506.

The overall computing environment 1502 can be composed of multiple homogeneous and/or heterogeneous cores, multiple CPUs of different kinds, media and other accelerators. The processing unit 1508 is responsible for processing the instructions of the algorithm. Further, the plurality of processing units 1508 can be located on a single chip or over multiple chips.

The algorithm including of instructions and codes for the implementation are stored in either the memory 1510 or the storage 1512 or both. At the time of execution, the instructions can be fetched from the corresponding memory 1510 and/or storage 1512, and executed by the processing unit 1508.

In case of any hardware implementations networking devices 1516 or external I/O devices 1514 can be connected to the computing environment to support the implementation through the networking interface and the I/O device interface.

In addition, the exemplary embodiments may also be implemented through computer-readable code and/or instructions on a medium, e.g., a non-transitory computer-readable medium, to control at least one processing element to implement any above-described embodiments. The medium may correspond to any medium or media which may serve as a storage and/or perform transmission of the computer-readable code.

The computer-readable code may be recorded and/or transferred on a medium in a variety of ways, and examples of the medium include recording media, such as magnetic storage media (e.g., ROM, floppy disks, hard disks, etc.) and optical recording media (e.g., compact disc read only memories (CD-ROMs) or digital versatile discs (DVDs)), and transmission media such as Internet transmission media. Thus, the medium may have a structure suitable for storing or carrying a signal or information, such as a device carrying a bitstream according to one or more exemplary embodiments. The medium may also be on a distributed network, so that the computer-readable code is stored and/or transferred on the medium and executed in a distributed fashion. Furthermore, the processing element may include a processor or a computer processor, and the processing element may be distributed and/or included in a single device.

The foregoing exemplary embodiments and advantages are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A method of transmitting data from a first electronic device to a second electronic device, via a human body as a signal transmission path, the method comprising:
   detecting, by the first electronic device, a first touch event on the first electronic device, wherein the first touch event corresponds to the data;
   transmitting, by the first electronic device, a first carrier signal to the second electronic device via the human body in response to the detecting the first touch event, wherein the first carrier signal that is received in the second electronic device contains a first biometric parameter of a user;
   receiving, by the first electronic device, a second carrier signal from the second electronic device via the human body in response to the transmitting the first carrier signal, wherein the second carrier signal includes information on a second touch event that is detected on the second electronic device, the second touch event corresponds to a memory location in the second electronic device, and the received second carrier signal contains a second biometric parameter of the user;
   acquiring, by the first electronic device, at least one of the first biometric parameter and the second biometric parameter;
   authenticating, by the first electronic device, the user, based on at least one of the first biometric parameter and the second biometric parameter; and
   transmitting, by the first electronic device, in response to the user being successfully authenticated, the data to the second electronic device via the human body, wherein the transmitting the data is performed via the human body as a communication channel, in response to the first touch event and the second touch event being input by the human body and maintained together at least until completion of the transmitting the data,
   wherein each of the first biometric parameter and the second biometric parameter comprises any one or any combination of a fingerprint, a heart rate, skin characteristics, retinal characteristics, and voice characteristics.

2. The method of claim 1, wherein the authenticating the user comprises at least one of:
   determining a first match between the first biometric parameter and a first pre-stored biometric parameter; and determining a second match between the second biometric parameter and a second pre-stored biometric parameter, to authenticate the user.

3. A first electronic device configured to transmit data to a second electronic device via a human body, the first electronic device comprising:
- at least one processor configured to detect a first touch event on the first electronic device, wherein the first touch event corresponds to the data;
- a transmitter configured to, in response to the first touch event being detected, transmit a first carrier signal to the second electronic device via the human body, wherein the first carrier signal received in the second electronic device contains a first biometric parameter of a user; and
- a receiver configured to receive a second carrier signal from the second electronic device via the human body in response to the transmitting the first carrier signal, wherein the second carrier signal includes information on detection of a second touch event on the second electronic device, the second touch event corresponds to a memory location in the second electronic device, and the received second carrier signal contains a second biometric parameter of the user, wherein the at least one processor is further configured to:
- acquire at least one of the first biometric parameter and the second biometric parameter;
- authenticate the user, based on at least one of the first biometric parameter and the second biometric parameter; and
- control to transmit, if the user is successfully authenticated, the data to the second electronic device via the human body as a communication channel, in response to the first touch event and the second touch event being input by the human body and maintained together at least until completion of the transmitting the data, wherein each of the first biometric parameter and the second biometric parameter comprises any one or any combination of a fingerprint, a heart rate, skin characteristics, retinal characteristics, and voice characteristics.

4. The first electronic device of claim 3, wherein the at least one processor is configured to authenticate the user by performing at least one of determining a first match between the first biometric parameter and a first pre-stored biometric parameter, and determining a second match between the second biometric parameter and a second pre-stored biometric parameter to authenticate the user.

5. The first electronic device of claim 3, wherein the at least one processor is configured to detect the first touch event on a touchpad that comprises a capacitive layer connected to a modulator of the first electronic device, and
wherein the capacitive layer comprises either one or both of a touch screen layer and a data coupling layer.

6. The first electronic device of claim 3, wherein the data that is transmitted to the second electronic device is demodulated by a demodulator of the second electronic device, and
the data that is demodulated is stored in the memory location of the second electronic device.

7. The first electronic device of claim 6, wherein the demodulator of the second electronic device is connected to a capacitive layer of a touchpad of the second electronic device.

8. The first electronic device of claim 3, wherein the at least one processor is configured to detect the first touch event on a touchpad through an input interface, and
wherein the input interface comprises at least one of a direct physical contact and a stylus that is coated with a conducting material.

9. The first electronic device of claim 3, wherein the at least one processor is configured to transmit the data to the second electronic device, in response to detecting the first touch event based on a first data coupling layer of the first electronic device and detecting the second touch event based on a second data coupling layer of the second electronic device.

* * * * *